US011536572B2

(12) United States Patent
Agarwal et al.

(10) Patent No.: US 11,536,572 B2
(45) Date of Patent: Dec. 27, 2022

(54) METHOD AND SYSTEM FOR ACCURATE LONG TERM SIMULTANEOUS LOCALIZATION AND MAPPING WITH ABSOLUTE ORIENTATION SENSING

(71) Applicant: The Texas A&M University System, College Station, TX (US)

(72) Inventors: Saurav Agarwal, College Station, TX (US); Suman Chakravorty, College Station, TX (US)

(73) Assignee: The Texas A&M University System, College Station, TX (US)

(*) Notice: Subject to any disclaimer, the term of this patent is extended or adjusted under 35 U.S.C. 154(b) by 155 days.

(21) Appl. No.: 16/342,273

(22) PCT Filed: Nov. 9, 2017

(86) PCT No.: PCT/US2017/060954
§ 371 (c)(1),
(2) Date: Apr. 16, 2019

(87) PCT Pub. No.: WO2018/089703
PCT Pub. Date: May 17, 2018

(65) Prior Publication Data
US 2019/0323845 A1  Oct. 24, 2019

Related U.S. Application Data

(60) Provisional application No. 62/419,624, filed on Nov. 9, 2016.

(51) Int. Cl.
*G01C 21/32* (2006.01)
*G05D 1/02* (2020.01)

(52) U.S. Cl.
CPC .......... *G01C 21/32* (2013.01); *G05D 1/0231* (2013.01); *G05D 1/0274* (2013.01)

(58) Field of Classification Search
CPC ..... G01C 21/32; G05D 1/0231; G05D 1/0274
See application file for complete search history.

(56) References Cited

U.S. PATENT DOCUMENTS 10,725,478 B2 * 7/2020 Cobb ................... G01B 21/047
2004/0168148 A1   8/2004 Goncalves et al.
(Continued)

FOREIGN PATENT DOCUMENTS

DE          4429016 A1 *  2/1996   ........... G01C 21/005
WO     2016/077703 A1     5/2016
WO     2016/130719 A2     8/2016

OTHER PUBLICATIONS

English Translation of DE-4429016-A1.*
PCT/US2017/060954 International Search Report and Written Opinion dated Jan. 19, 2018 (12 p.).

*Primary Examiner* — Rami Khatib
*Assistant Examiner* — Shahira Baajour
(74) *Attorney, Agent, or Firm* — Conley Rose, P.C.

(57) ABSTRACT

Described herein are embodiments of a method and system that uses a vertical or upward facing imaging sensor to compute vehicle attitude, orientation, or heading and combines the computed vehicle attitude, orientation, or heading with range bearing measurements from an imaging sensor, LiDAR, sonar, etc., to features in the vicinity of the vehicle to compute accurate position and map estimates.

21 Claims, 13 Drawing Sheets

(56) References Cited

U.S. PATENT DOCUMENTS

| | | | |
|---|---|---|---|
| 2004/0186644 A1* | 9/2004 | McClure | A01B 69/008 |
| | | | 701/50 |
| 2012/0191272 A1* | 7/2012 | Andersen | B66F 9/24 |
| | | | 701/2 |
| 2013/0048722 A1 | 2/2013 | Davis et al. | |
| 2016/0033272 A1 | 2/2016 | Struckhoff et al. | |
| 2016/0070265 A1 | 3/2016 | Liu et al. | |
| 2018/0253105 A1* | 9/2018 | Suzuki | G01C 21/30 |

* cited by examiner

METHOD AND SYSTEM FOR ACCURATE LONG TERM SIMULTANEOUS LOCALIZATION AND MAPPING WITH ABSOLUTE ORIENTATION SENSING

CROSS-REFERENCE TO RELATED APPLICATIONS

This application is a 35 U.S.C. § 371 national stage application of PCT/US2017/060954 filed Nov. 9, 2017, which claims benefit of U.S. Provisional Patent Application No. 62/419,624 filed Nov. 9, 2016, and entitled, "Method and System for Accurate Long Term Localization and Navigation Using On-board Sensors," each of which is incorporated herein by reference in its entirety for all purposes.

STATEMENT REGARDING FEDERALLY SPONSORED RESEARCH OR DEVELOPMENT

This disclosure was made with U.S. Government support under IIS-1217991 awarded by the National Science Foundation. The government has certain rights in the embodiments of the disclosure.

TECHNICAL FIELD

The present disclosure relates to robotic mapping. In particular, accurate long term simultaneous localization and mapping with absolute orientation sensing.

BACKGROUND

When a robot is not given a priori knowledge of its environment, it must use its sensory data and actions to concurrently build a map of its environment and localize itself within its stochastic map, this is referred to as Simultaneous Localization and Mapping (SLAM). In SLAM, estimation errors tend to build up during exploratory motion and are usually negated by revisiting previously seen locations. When a robot returns to a previously visited location, this may be referred to as loop closure. Certain mobile robotics applications, e.g., autonomous cars, precision farming, planetary exploration etc. may require robots to accurately traverse long trajectories without revisiting previous locations. During long-term point-to-point navigation when global localization information (e.g., GPS) is unavailable or degraded, SLAM is often used. Conventional SLAM visual-inertial localization methods exhibit error of ≈0.3%-0.5% which may be unsuitable for precision tasks, e.g. for a 25 km trajectory, such error results in 75 m-125 m position error.

Some robots may be operated indoors where GPS is unavailable or degraded. For example, material handling robots that move goods (boxes, pallets etc.) in large warehouses and distribution centers do not have access to GPS satellites. Installing beacons, markers, or guide cables is expensive, and robots are often expected start without prior knowledge of the map of their operating environment. Further, warehouse environments are highly dynamic due to a mix of industrial vehicles (pallet jacks, forklifts etc.) and people moving rapidly across large floor spaces, thus a robot must continuously update its knowledge of the map and react to changes in its vicinity.

In some approaches, robots may be driven manually to gather and store measurements (e.g., laser scans, visual landmarks etc.). This data is then processed offline to build detailed maps. Computed maps are subsequently used for positioning and navigation by taking measurements to known features in the world.

Existing SLAM techniques correct estimation drift by relying on loop closure, i.e., revisiting previously seen locations and correctly associating sensor information to data previously stored in the map. There are at least two problems associated with loop closure. Loop closure is sensitive to data association accuracy, wrong data association can lead to catastrophic failure of the SLAM system; and data association reliability is limited by localization accuracy. Thus, localization drift may cause map quality to degrade as the scale of environment increases.

SUMMARY

Described herein are embodiments of a method and system that uses a vertical (e.g., upward facing) imaging sensor to compute vehicle attitude (e.g., orientation or heading) and combines the computed vehicle attitude with range bearing measurements (from an imaging sensor, LiDAR, sonar, etc.) to features in the vicinity of the vehicle to compute accurate position and map estimates.

In an embodiment, a mapping system is described. The mapping system may comprise an upward facing sensor; a range bearing sensor; and a processor in communication with the upward facing sensor and the range bearing sensor. The processor may be configured to determine an attitude of the mapping system based upon first data received from the upward facing sensor; determine a location of local landmarks based upon second data received from the range bearing sensor; and determine a location of the mapping system based upon the attitude and the location of the local landmarks. The first data may comprise bearing measurements to one or more features. The upward facing sensor may be a camera. The mapping system may further comprise an inertial sensor, wherein the processor may be further configured to determine a relative pose based upon a scan match, wherein the scan match comprises inputs of the second data and a third data received from the inertial sensor. The processor configured to determine the location of the mapping system may comprise the processor configured to fuse a result of the scan match with the attitude. The processor configured to fuse the result of the scan match with the attitude may comprise the processor configured to input the result of the scan match and the attitude to a Kalman filter. The processor may be further configured to update a map based upon the location of the mapping system and the location of the local landmarks.

In an embodiment, an autonomous vehicle is described. The autonomous vehicle may comprise an upward facing sensor; a range bearing sensor; and a mapping system in communication with the upward facing sensor and the range bearing sensor. The mapping system may comprise a processor configured to determine an attitude of the autonomous vehicle based upon first data received from the upward facing sensor; determine a location of local landmarks based upon second data received from the range bearing sensor; and determine a location of the autonomous vehicle based upon the attitude and the location of the local landmarks. The first data may comprise bearing measurements to one or more features. The upward facing sensor may be a camera. The autonomous vehicle may further comprise an inertial sensor, wherein the processor may be further configured to determine a relative pose based upon a scan match, wherein the scan match comprises inputs of the second data and a third data received from the inertial sensor. The processor configured to determine the location of the autonomous vehicle may comprise the processor configured to fuse a result of the scan match with the attitude. The processor configured to fuse the result of the scan match with the attitude may comprise the processor configured to input the result of the scan match and the attitude to a Kalman filter. The processor may be further configured to update a map based upon the location of the autonomous vehicle and the location of the local landmarks.

In an embodiment, a method for mapping is described. The method may comprise determining an attitude of a mapping system based upon first data received from an upward facing sensor; determining a location of local landmarks based upon second data received from a range bearing sensor; and determining a location of the mapping system based upon the attitude and the location of the local landmarks. The first data may comprise bearing measurements to one or more features. The method may further comprise determining a relative pose based upon a scan match, wherein the scan match comprises inputs of the second data and a third data received from an inertial sensor. Determining the location of the mapping system may comprise fusing a result of the scan match with the attitude. Fusing the result of the scan match with the attitude may comprise inputting the result of the scan match and the attitude to a Kalman filter. The method may further comprise updating a map based upon the location of the mapping system and the location of the local landmarks.

BRIEF DESCRIPTION OF THE DRAWINGS

Further embodiment of the disclosure will be described with respect to the following figures, in which.

DETAILED DESCRIPTION

Figure 1:
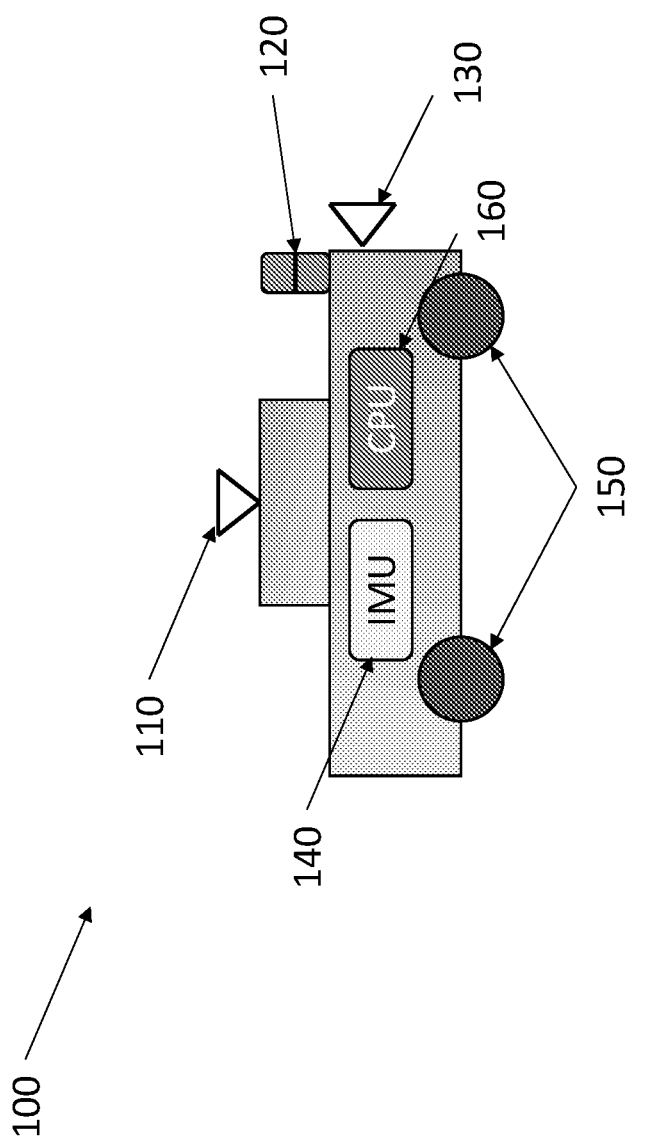
FIG. 1 is a diagram of an embodiment of a robot configured for long term SLAM with absolute orientation sensing.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Estimation drift during exploration may be caused by robot heading uncertainty. In some approaches, reliable absolute orientation measurements may not be available in SLAM. These approaches may rely on odometry and relative pose or feature measurements to estimate robot orientation and position. Embodiments of the present disclosure may attain an accuracy (i.e., error in position as percentage of distance travelled) of 0.0016% for a 107.9 km trajectory without loops using absolute orientation sensor technology. An instantaneous location and/or heading of a robot may be referred to herein as a pose.

A robot using SLAM with a heading sensor in Extended Kalman Filter-based SLAM (EKF-SLAM) may move much further into unknown areas with consistent estimates. Consistency in a filter implies that the estimation uncertainty captures the true error; conversely an inconsistent filter does not capture true error and may give a false sense of confidence in the robot's belief.

Two methods of SLAM may be used, filtering-based methods and graph-based methods. Filtering-based methods may maintain a recursive estimate using current robot pose and map. Graph-based methods use robot poses as nodes of a graph and constraints as edges. Graph based SLAM may use a two-pronged approach, 1) a front-end which maintains an estimate of the robot pose and computes data association between current and past observations, and 2) a back-end which solves the non-linear optimization to compute the history of robot poses.

Analysis of EKF-SLAM shows that heading, i.e., robot orientation may be unobservable in the EKF-SLAM formulation. Analysis of the consistency of EKF-SLAM further shows that heading estimation errors may be a cause of inconsistency due to erroneous Jacobian computations. In the case of a stationary robot with zero process noise observing one feature, EKF-SLAM heading estimate may drift. The EKF-SLAM filter may be overconfident, i.e., uncertainty estimates may not reflect the true error and heading uncertainty may be the major cause of inconsistency.

In graph-based SLAM, non-linear optimization techniques may be used to solve for the maximum likelihood estimate. Graph-based SLAM techniques may rely on an initial guess to bootstrap the optimizer. This initial guess may be based on odometery and may be arbitrarily bad leading to local minima. A special property of SLAM is that when robot orientation is known, SLAM may be posed as a linear estimation problem in position. Some approaches have exploited this structural property with the aim of decoupling non-linearities that arise due to orientation.

Estimating orientation as the first step and using these estimates to initialize pose graph optimization may result in a robust solution. The separation of orientation and position may be extended to feature-based SLAM. Estimating orientation first may avoid catastrophic failure, e.g. local minima.

The embodiments described herein include autonomous robot localization and mapping that fuses absolute orientation sensing (using cameras that track stable structural features), with local measurements using a LIDAR, camera, or some other imaging or sensing technique. In some embodiments a robot or autonomous vehicle includes a long term SLAM with absolute orientation sensing system. The robot or autonomous vehicle may be configured to travel over land, through air, water, or any other medium of travel. The system may include a sensor array. The sensor array may include one or more orientation sensors, odometery sensors (such as inertial measurement units, wheel encoders, etc.), and at least one exteroceptive sensor. The orientation sensor may be, for example, a star tracker, a sun sensor, a magnetometer, or a gyrocompass, or an upward facing camera. The inertial sensor may include a combination of accelerometer and gyroscope which measure the vehicles acceleration and angular rates. The odometery sensors may include a rotary encoder coupled to a wheel of the vehicle, or other device for determining distance traveled by the vehicle over a time interval. The exteroceptive sensor (i.e., a range bearing sensor) may include a camera, a LIDAR system, a RADAR system, a SONAR system, or other system for providing distance and bearing measurements to features in view of the vehicle. For example, features outdoors may include stars when a star tracker is used; and features indoors may include light fixtures or other fixtures on the ceiling. The system includes a processor (e.g., a microprocessor, digital-signal-processor, etc.) coupled to the sensor array. The processor receives measurements from the various sensors of the sensor array. The navigation system also includes memory (e.g., volatile or non-volatile semiconductor memory) coupled to the processor. The processor may store the measurements received from the sensor array in the memory. The memory may also store instructions that can be executed by the processor to process the measurements and provide the long term SLAM with absolute orientation sensing functionality described herein. For example, the processor may process the measurements to determine a location of the vehicle as described herein, to control a motor or other propulsion system of the vehicle, and/or to control a steering system of the vehicle based on the determined location of the vehicle.

Other sensors such as magnetometers and gyrocompasses which may be used to provide absolute orientation. Magnetometers may function adequately when the Earth's magnetic field is not corrupted by external influences. Gyrocompasses measure the planet's rotation to determine accurate heading with respect to geographic north. Microelectromechanical Systems (MEMS)-based gyrocompasses have been proposed and may be useful for providing absolute orientation. The methods presented in this disclosure may use magnetometer or gyrocompass for orientation sensing alone or in combination with a star tracker or sun sensor or other upward facing sensor.

FIG. 1 is a diagram of an embodiment of a vehicle 100 with a long term SLAM with absolute orientation sensing system. The long term SLAM with absolute orientation sensing system may comprise an upward facing sensor 110, a range bearing sensor 120, a camera 130, an inertial measurement unit 140, wheel encoders 150, and a processor 160. The processor 160 may receive inputs from one or more of the upward facing sensor 110, the range bearing sensor 120, the camera 130, the inertial measurement unit 140, or the wheel encoders 150. Upward facing sensor 110 may be used to determine an orientation of the vehicle 100 based upon landmarks above the vehicle 100. For example, in an indoor situation, the upward facing sensor 110 may be a camera that captures images of the ceiling of a building where the vehicle 100 is located. In another example, the upward facing sensor 110 may be a star tracker that captures images of stars or other landmarks in the sky. The orientation determined by the upward facing sensor 110 may be used with data from one or more of the range bearing sensor 120, the camera 130, the inertial measurement unit 140, or the wheel encoders 150 by the processor 160 to determine a location and orientation of the vehicle 100. This information may be used to create or update a virtual map of the environment where the vehicle is operating. One or more of the range bearing sensor 120, the camera 130, the inertial measurement unit 140, or the wheel encoders 150 may be optional in some embodiments. The range bearing sensor 120 may a LiDAR, sonar, or some other sensor that detects objects in the environment surrounding the vehicle 100. Camera 130 may a stereo camera or some other image capture device that detects objects in the environment surrounding the vehicle 100. The IMU 140 may be configured to measure the movement of the vehicle 100. Likewise, wheel encoders 150 may count revolutions of the wheels and determine a distance traveled by vehicle 100.

Figure 2:
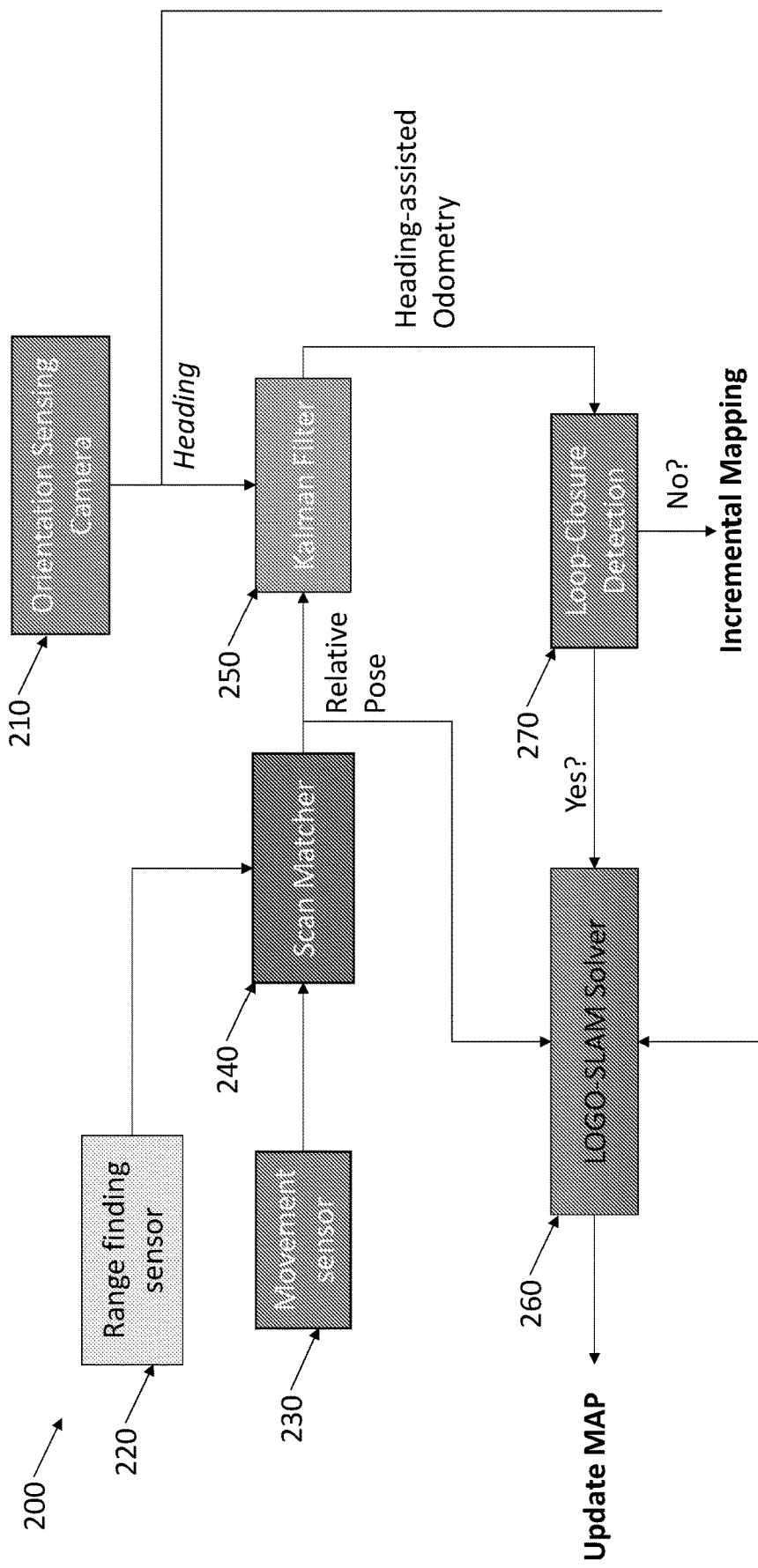
FIG. 2 is a flow diagram of an embodiment of a method for long term SLAM with absolute orientation sensing.

FIG. 2 is a flow diagram of an embodiment of a method for long term SLAM with absolute orientation sensing 200. The embodiment may be implemented by a mapping system. At block 210, an orientation sensing camera, e.g., upward facing sensor 110, may determine a heading (e.g., attitude or orientation) of a vehicle, e.g., vehicle 110. The heading may be provided to a LOGO slam solver 260. The LOGO slam solver 260 may be executed by a processor, e.g., processor 160. The heading may also be provided to a Kalman filter 250. A scan matcher 240 may determine a relative pose based on input from a range finding sensor 220 and/or a movement sensor 230. Range finding sensor 220 may be a LiDAR, sonar, radar or some other sensor configured to detect objects and their range from the vehicle.

Movement sensor 230 may an IMU, a wheel encoder, or any other sensor configured to detect movement of the vehicle and estimate a distance traveled based on the movement detected. The relative pose information from scan matcher 240 may be provided to the Kalman filter 250. The Kalman filter 250 may fuse the relative pose information with the heading to determine a location of the vehicle. If the mapping system determines with a predetermined accuracy that the vehicle is revisiting a previously visited location, then the mapping system may assume loop closure has occurred. If loop closure has occurred, the LOGO slam solver 260 may use the output of the scan matcher 240 along with the heading to update the map. If loop closure has not been detected, the mapping system may perform incremental mapping. While the embodiment of FIG. 2 is described in terms of a mapping system on a vehicle, the method may be implemented by mapping system on a handheld device or any other device comprising the elements described in the description of FIG. 2. Further, the vehicle may be autonomous or manually controlled.

Outdoor Embodiments

The following embodiments describe systems that operate in an outdoor environment where the upward facing sensor 110 detects objects in the sky. Some of the techniques in these embodiments may be used in either the indoor and outdoor embodiments. Star trackers may be automated camera-based devices that compute inertial attitude with high accuracy. Some star trackers may deliver RMS error down to 10 arcseconds or 0.0028° by using measurements to known celestial bodies and comparing them to star charts. Star trackers may rely on measurements to persistent beacons in space whose trajectories across the sky relative to Earth or other planets may be fixed with great precision based on long-term astronomical observations. Star trackers may be used when GPS is unavailable during both day and night operation. The method of the present disclosure may combine any combination of proprioceptive (odometry) sensors (e.g., inertial sensors, wheel odometer etc.) and/or exteroceptive sensors (e.g., camera, LIDARs etc.) with star tracking or sun sensors for accurate global navigation.

In an embodiment using a star tracker or sun sensor, let $x_k \in \mathbb{X}$, $u_k \in \mathbb{U}$, and $z_k \in \mathbb{Z}$ represent the system state, control input, and observation at time step k respectively, where $\mathbb{U}$, $\mathbb{X}$, $\mathbb{Z}$ denote the state, control, and observation spaces respectively. A keyframe pose is designated as $^K x$. The state evolution model f is denoted as $x_{k+1} = f(x_k, u_k) + w_k$, where $w_k \sim \mathcal{N}(0, Q_k)$ is zero-mean Gaussian process noise. The robot belief is defined as the probability distribution over all possible states of the robot. Let the belief at time $t_k$ be $b_k \in \mathbb{B}$ where $\mathbb{B}$ is the belief space. Then $b_k$ represents the posterior over the history of the robot's actions and observations, thus:

$$b_k = p(x_k | x_0, \mathcal{Z}_k, \mathcal{U}_{k-1}) \tag{1}$$

where:
$\mathcal{Z}_k$ is the history of observations up to time $t_k$, and
$\mathcal{U}_{k-1}$ is the history of actions up to time $t_{k-1}$.

The measurement model h is denoted as $z_k = h(x_k) + v_k$, where $v_k \sim \mathcal{N}(0, R_k)$ is zero-mean Gaussian measurement noise. The map (unknown at $t_0$) is a set of landmarks (i.e., features) distributed throughout the environment. The j-th landmark is defined as $l_j$ and $\hat{l}_j$ as the estimate of $l_j$. The observation for landmark $l_j$ at time $t_k$ is denoted by $z_k^j \in z_k$. The inverse measurement model is denoted by g such that for a given measurement $z_k^j$ and the state $x_k$ at which it was made, g computes the landmark location $l_j = g(x_k, z_k^j)$. $^l d_k^{ij}$, is the relative feature measurement, from feature $l_i$ to $l_j$ in the local frame of the robot at time $t_k$. In the framework of the present disclosure, a relative feature measurement is an estimate of the displacement vector from one feature to another. The local relative measurement is computed as $^l d_k^{ij} = {}^l \Delta_k^j - {}^l \Delta_k^i$, where $^l \Delta_k^i$, $^l \Delta_k^j$ are relative positions of features $l_i$ and $l_j$ respectively with respect to the robot in its local frame. Thus it is linear in positions of the two features in the local frame. Let $C(\theta_k)$ denote the direction cosine matrix (DCM) of the robot orientation at state $x_k$. C is a function of the robot orientation parameter $\theta_k$ (e.g., Euler angles, Quaternions etc.). A local measurement in the robot frame can be projected into a fixed world frame (i.e., a global frame, the frame may be an earth centered inertial frame, frame here refers to a cartesian coordinate frame of reference) as:

$$C(\theta_k)^T {}^l \Delta_k^i = {}^w \Delta_k^i = l_i - p_k, \tag{2}$$

where:
$l_i$ and $p_k$ are the feature and robot positions in the world frame respectively.

Thus, when robot orientation θ is known, the position estimation problem may be linear.

Figure 3A:
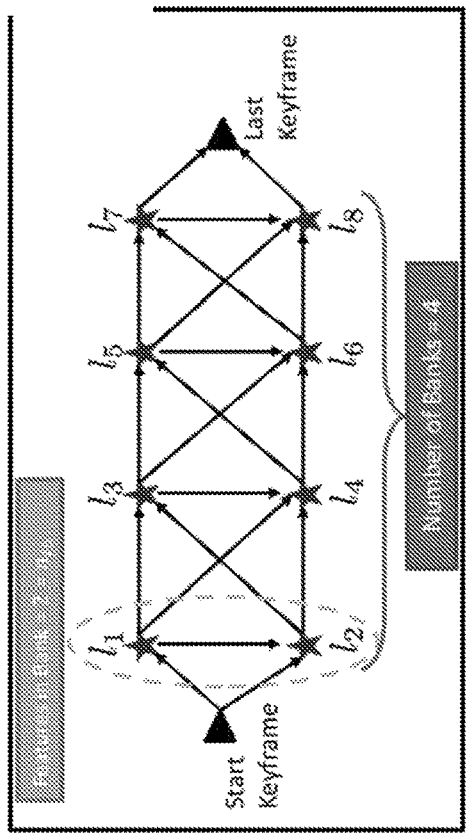
FIG. 3A is a diagram of an embodiment of robot to feature relative measurement by a robot.

Embodiments disclosed herein may include various approaches for long-term localization. Two such approaches are Robot to Feature Relative Measurement Model (R2F) and Feature to Feature Relative Measurement Model (F2F). R2F may be designed for systems where a robot moves continuously and has access to odometery, orientation sensor and exteroceptive sensing e.g., Lidar, cameras, etc. R2F may convert local relative measurements from the robot to features at each pose to global frame measurements as shown in FIG. 3A. These measurement may then be used to solve a linear estimation problem of the robot and feature positions to attain a high-degree of accuracy. F2F may extend the R2F for systems where extremely high-precision is required. When extremely high-precision is required, odometery may not provide reliable information and time budgets may be relatively large. In this case, independent measurements are made for relative displacements between features which are then chained together to estimate the map and robot position as shown in FIG. 3B.

Figure 3B:
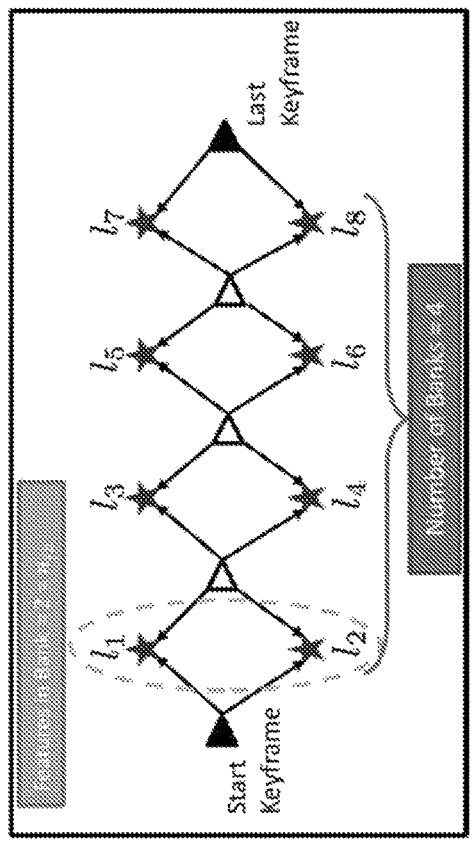
FIG. 3B is a diagram of an embodiment of feature to feature relative measurement by a robot.

In the scenario of FIGS. 3A and 3B, a robot may observe four banks of features prior to final pose, i.e., last keyframe. There may be two features in each bank. For example, the first bank indicated by the dashed ellipse may include $l_1$ and $l_2$. A bank may be described as the set of features observed at a particular pose. FIG. 3A shows how R2F makes relative measurements from robot to features. The relative measurements are indicated by the lines with arrowheads. The keyframes are indicated by the black and white triangles and indicate positions where the robot may make relative measurements.

Figure 4:
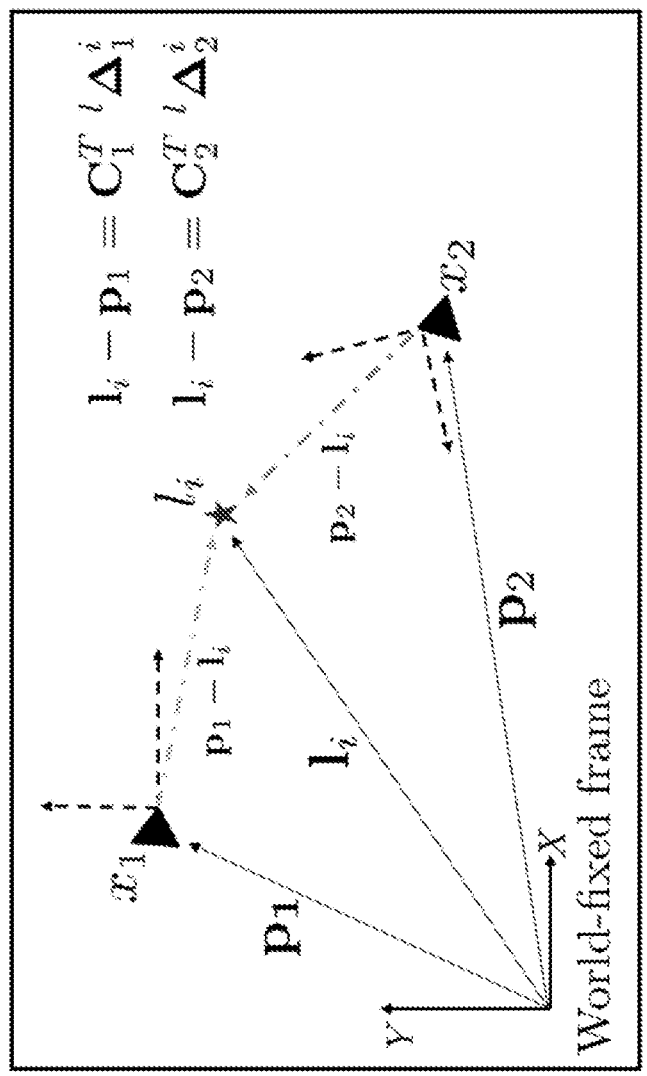
FIG. 4 is a diagram of an embodiment of a robot viewing a feature from two poses in robot to feature relative measurement.

The R2F approach includes the following steps. 1) Range bearing measurements to features are converted into relative displacement vectors from robot to features at each pose as the robot moves as shown in FIG. 4. In FIG. 4, the robot may detect the landmark $l_i$ from two poses $x_1$ and $x_2$. The transformation of local relative measurements to the global frame may be used to solve for robot and feature positions. 2) At keyframe poses, a linear estimation problem may be solved for the robot pose and features using the recorded data. 3) Once the linear estimation problem is solved, correlations between keyframe poses and features observed at keyframe poses may be maintained, intermediate feature and pose estimates may be dropped. 4) An upper threshold may be set on the number of keyframes to keep in the map after which the oldest keyframe is deleted. The first pose may be saved even if it is the oldest keyframe.

The R2F approach will now be explained in greater detail. Let $$L_k = \{l_{k_1}, l_{k_2}, \ldots, l_{k_n}\}$$

be the set of landmarks visible at time $t_k$. Let $$z_k = \left\{z_k^{l_{k_1}}, z_k^{l_{k_2}}, \ldots, z_k^{l_{k_n}}\right\}$$

be the set of range bearing observations to the set of landmarks visible at time $t_k$. Using the inverse measurement model g (described above), the position of landmark $l_i$ in robot's local frame is ${}^l\Delta_k^i = {}^lg(z_k^i)$. Hence, the vector of local robot to feature relative measurements is:

$${}^l\hat{\Delta}_k = {}^lg(z_k) = \begin{bmatrix} {}^lg(z_k^{l_{k_1}}) \\ {}^lg(z_k^{l_{k_2}}) \\ \vdots \\ {}^lg(z_k^{l_{k_n}}) \end{bmatrix}. \quad (3)$$

Thus, ${}^l\hat{\Delta}_k \sim \mathcal{N}({}^l\Delta_k, {}^lR_{\Delta_k} = \nabla^l g|_{z_k} R_{z_k} \nabla^l g^T|_{z_k})$, where $\nabla^l g|_{z_k}$ is the Jacobian of measurement function in Eq. 3. At $t_0$, embodiments have keyframe ${}^K x_0$ whose prior belief $b_0 \sim \mathcal{N}(\hat{x}_0 = [\hat{p}_0^T, \hat{\theta}_0^T]^T P_0)$ is known. The robot starts moving and collecting odometery, orientation, and exteroceptive measurements at each timestep. At some future timestep $t_k$, embodiments have keyframe ${}^K x_k$. Abusing notation slightly, let ${}^l\hat{\Delta}_{0:k} \sim \mathcal{N}({}^l\Delta_{0:k}, {}^lR_{\Delta_{0:k}})$ be the vector of all local relative position measurements (including robot to feature and translational odometery) recorded at poses $x_{0:k}$. At each $t_k$ embodiments have a noisy unbiased orientation measurement which gives the vector $\hat{\theta}_{0:k} \sim \mathcal{N}(\theta_{0:k}, R_{\theta_{0:k}})$. Dropping the time subscript for readability, local relative measurements ${}^l\hat{\Delta}$ may be transformed to the world frame as:

$${}^w\hat{\Delta} = \hat{C}^T(\hat{\theta}_k){}^l\hat{\Delta}, \quad (4)$$

where:

$\hat{C} = C(\hat{\theta})$ is the corresponding composition of DCM matrices parametrized by the heading measurements $\hat{\theta}$.

Based on equation (4), transformed global measurements at each pose $x_k$ may be correlated to heading measurement $\hat{\theta}_k$. Heading error covariances may be propagated appropriately in the feature and robot position estimation. Embodiments setup a new measurement model $\beta = h_\beta(x_0, {}^l\Delta, \theta) + v_\beta$ by stacking the transformed odometery between poses, robot to feature displacement, heading measurements, and the prior estimate of ${}^K x_0$ (given). This gives the following linear problem:

$$\beta = \begin{bmatrix} \hat{p}_0 \\ \hat{C}^{T\,l}\hat{\Delta}_{odo} \\ \hat{\theta} \end{bmatrix} = \underbrace{\begin{bmatrix} A' & 0 \\ 0 & I \end{bmatrix}}_{A} \begin{bmatrix} p_0 \\ p \\ l \\ \theta \end{bmatrix} + v_\beta, \quad (5)$$

where $[p_0^T, p^T, l^T, \theta^T]^T$ is the vector of robot poses, landmarks, and heading, A' is a matrix with each row containing elements of the set $\{-1, 0, +1\}$, $v_\beta \sim \mathcal{N}(0, R_\beta)$ is the measurement noise vector with covariance:

$$R_\beta = \nabla h_\beta \begin{bmatrix} P_0 & 0 & 0 \\ 0 & {}^lR_\Delta & 0 \\ 0 & 0 & \Sigma_\theta \end{bmatrix} \nabla^T h_\beta. \quad (6)$$

$P_0$ is the prior error covariance of ${}^K x_0$ and $\nabla h_\beta$ is the Jacobian of measurement function $h_\beta$ given by $$\nabla h_\beta = \begin{bmatrix} I & 0 & 0 \\ 0 & C^T & M^l\hat{\Delta} \\ 0 & 0 & I \end{bmatrix}, \, M = \frac{\partial \hat{C}^T}{\partial \theta}\bigg|_{\theta=\hat{\theta}}. \quad (7)$$

The solution to the linear problem in equation (5) is given by:

$$\begin{bmatrix} p^* \\ l^* \\ \theta^* \end{bmatrix} = (A^T R_\beta^{-1} A)^{-1} A^T R_\beta^{-1} \beta. \quad (8)$$

From equation (8), $[p^{+T}, l^{+T}]^T$ are of interest. At a future keyframe, in Eq. 5 embodiments may replace $p_0$ with estimates of past keyframes and corresponding landmarks observed at those keyframes.

The R2F approach may be analyzed for location accuracy and the effect of loop closure as a robot explores an unknown map. For the sake of clarity, it is assumed that the robot makes independent measurements of global frame displacement from robot to feature and error covariance of every global relative measurement is $R_\alpha$. In practice, independence may be achieved by capturing heading observations such that the same heading observation is not used to transform all local measurements to world frame. The first and last pose of the robot are considered as keyframes with first pose known.

Figure 5A:
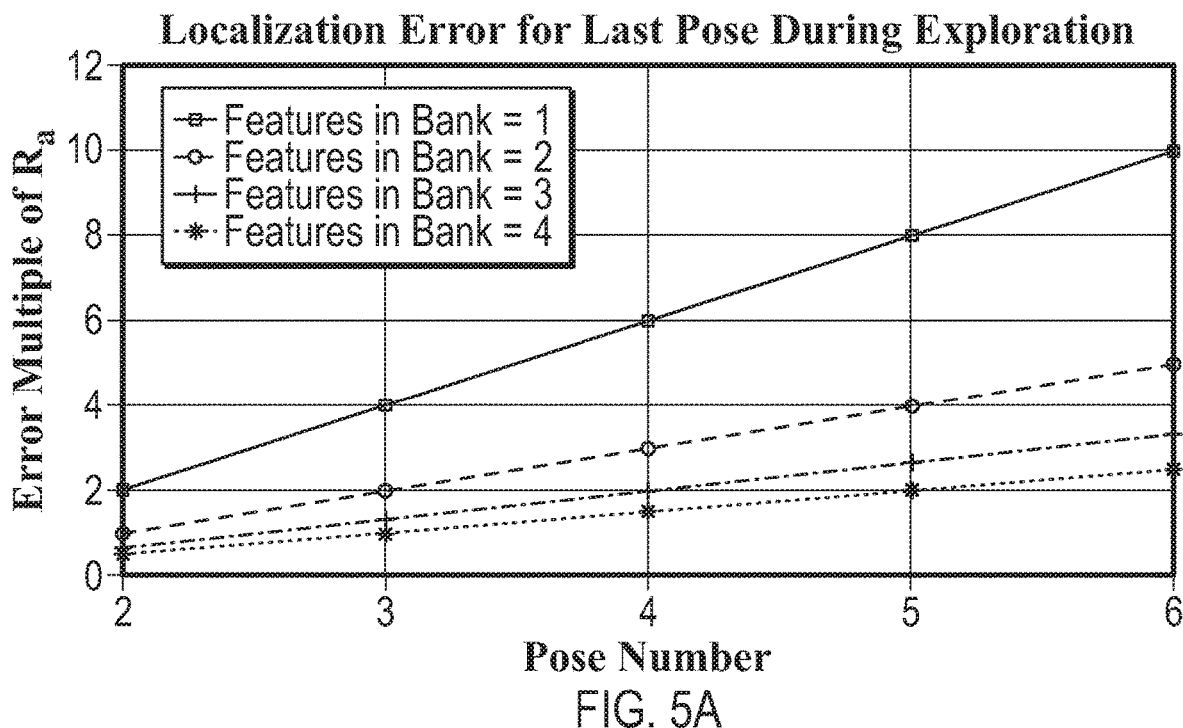
FIG. 5A is a graph of error growth in estimate of a last pose as a function of how far a robot moves of an embodiment described herein.
Figure 5B:
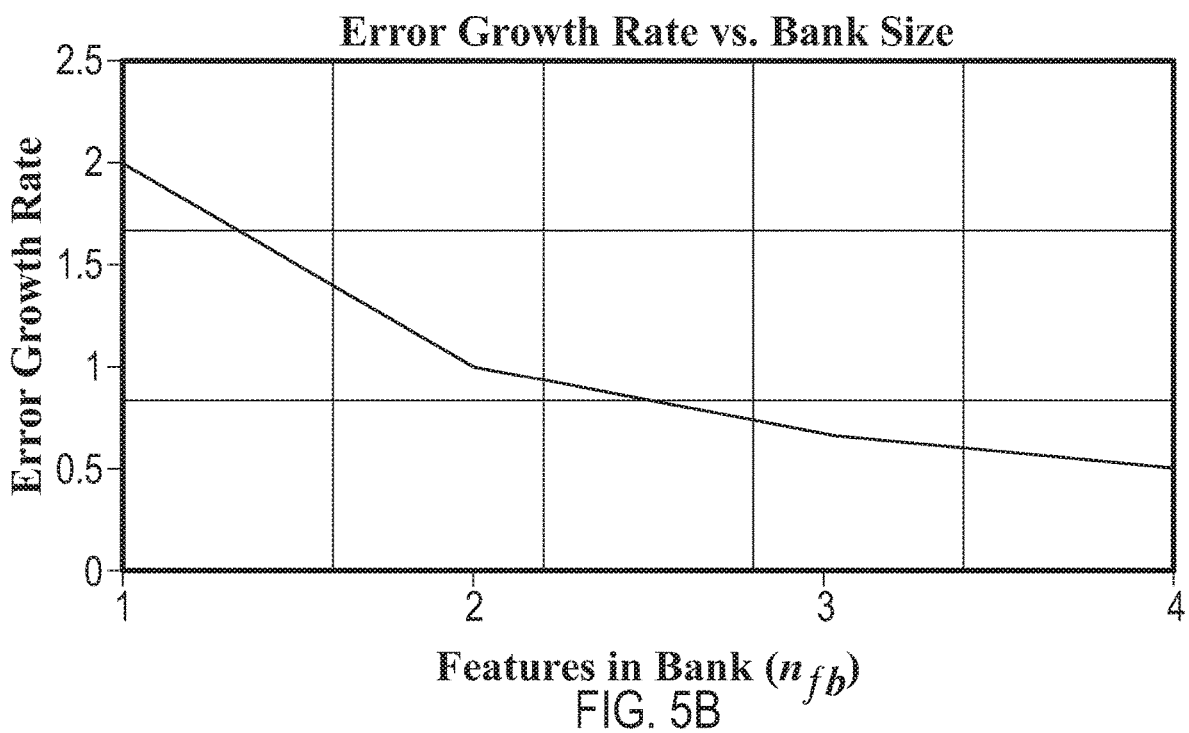
FIG. 5B is a graph of reduction in error growth rate as a number of landmarks increases of an embodiment described herein.

In an exploration task, a robot may move into unknown areas and make measurements to a bank of features at each timestep as shown in FIG. 3A. FIGS. 5A-5D show analysis of the pose and map estimation error as the robot moves and the effect of loop closure in the estimates using the R2F approach. FIG. 5A shows that the error growth is linear as final pose moves further away from its start. An interesting point arises in FIG. 5B, the rate of error growth drops as $\propto 1/n_{fb}$ where $n_{fb}$ is the number of features in each bank. Thus it implies that for long-term autonomy, it is beneficial to make high-quality observations to a number of features greater than one, but hundreds or thousands of features may not always be needed because the additional features above a certain threshold show decreasing improvement in accuracy. Thus, localization error for a given task may be predicted and a determination made of how many features to observe to balance computational complexity and memory resources with accuracy.

Figure 5C:
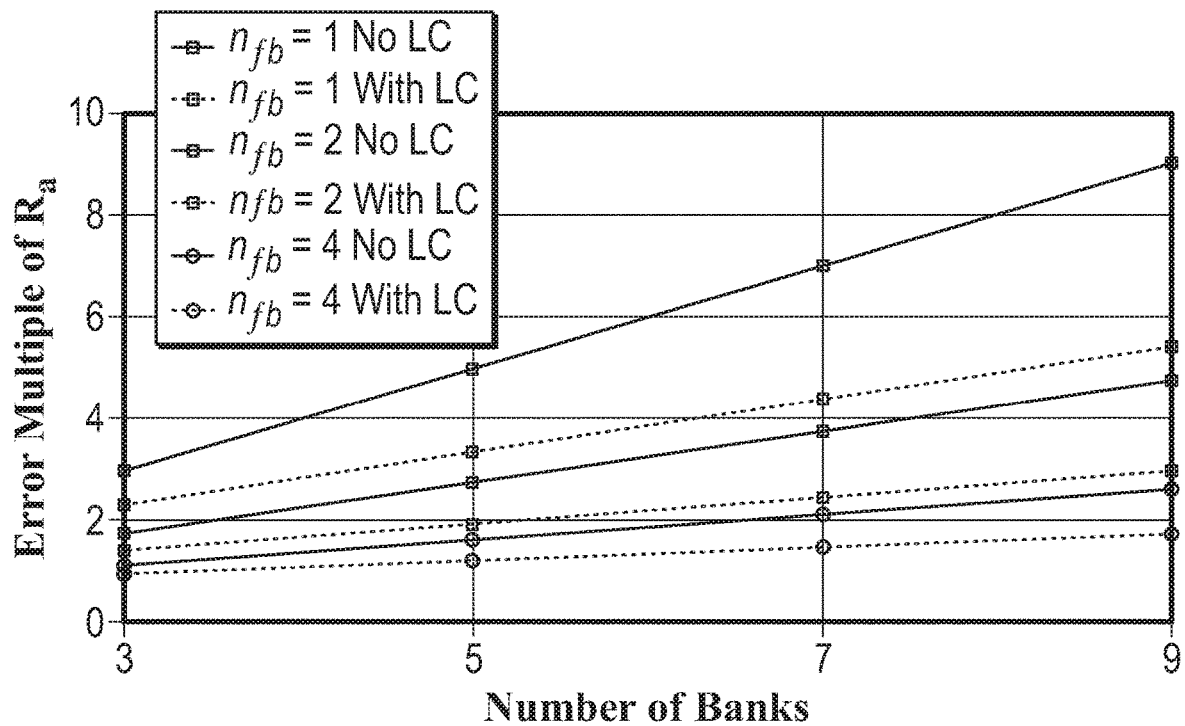
FIG. 5C is a graph of localization error for a feature bank most distant from a starting location before and after loop closure of an embodiment described herein.
Figure 5D:
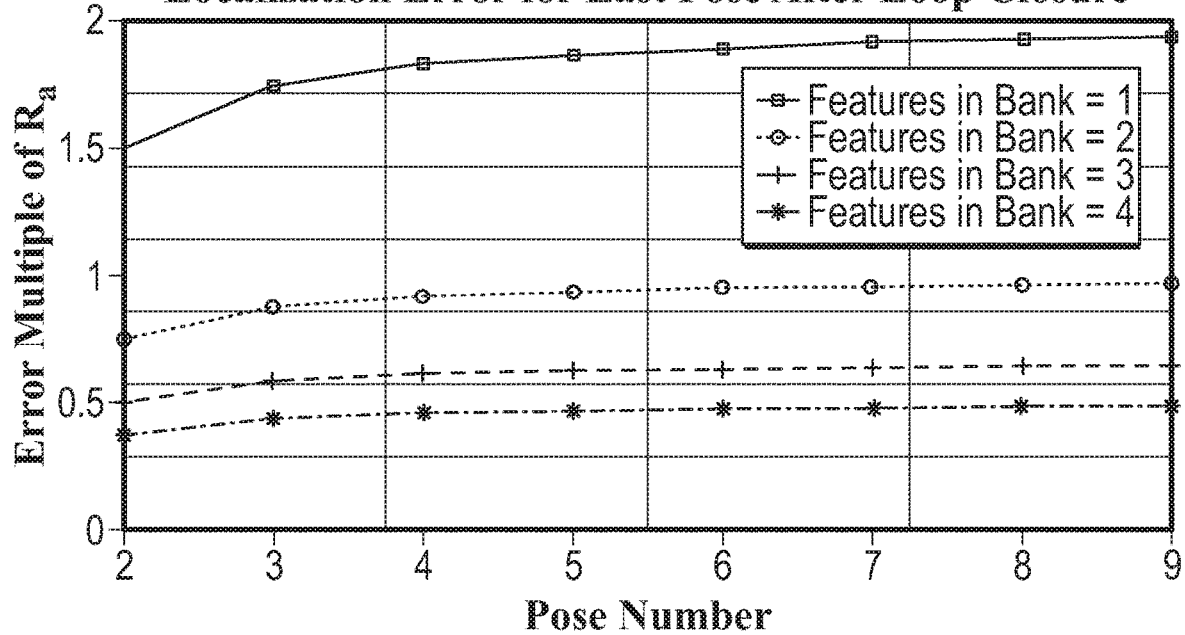
FIG. 5D is a graph of localization error in a last pose after loop closure as the trajectory length (number of banks mapped) increases of an embodiment described herein.

Loop closure may be considered a necessary action in SLAM to limit error growth. However, in the case of long-term point-to-point navigation, loop closure may not be possible. The effect of loop closure on the bank of features farthest from the start location in a loop and on the last pose is analyzed in FIGS. 5C and 5D. For the error in farthest bank, FIG. 5C shows that the effect of loop closure diminishes as the bank size increases as shown by the gap between solid and dashed lines, e.g., after mapping 9 feature banks, with 1 feature in each bank error drops to 60.49% and with 4 features drops to 66.14% after loop closure. Note that the ratio of error growth rate after and before loop closure is 0.5185, i.e., loop closure approximately halves the error growth in the farthest bank. In point-to-point navigation, the same effect may be achieved by taking twice the number of measurements to each feature. FIG. 5D shows that error in last pose after loop closure converges to a fixed value as the trajectory length increases. This indicates that estimation error in the last pose is dominated by the relative measurement to the first bank, i.e., as the trajectory length grows, the effect of the longer "pathway" from start may have almost no effect on estimation accuracy.

In the F2F approach, the mapping algorithm may transform range bearing observations from robot to features into relative position measurements between features by fusing them with heading estimates from a heading sensor. FIG. 3B shows how F2F estimates keyframe poses and may neglect odometery between poses. Localization accuracy may be a function of how far the robot has moved and the number of features in each bank. The key steps of F2F include the following. 1) Range bearing measurements to features may be converted into relative displacement vectors between the features at each pose as the robot moves. 2) Robot to feature relative position measurements may be acquired at keyframes, then a linear estimation problem may be solved for keyframe poses and map features using the recorded data. 3) Once the linear estimation problem is solved, correlations between keyframe poses and features observed at keyframes may be maintained and intermediate feature estimates may be dropped. 4) An upper threshold may be set on the number of keyframes to keep in the map after which the oldest keyframe is deleted. The first pose may be saved even if it is the oldest keyframe.

The F2F approach will now be explained in detail. At time $t_k$, the position of features $l_i$ and $l_j$ in the robot's local frame are ${}^l\Delta_k^i$ and ${}^l\Delta_k^j$ respectively. Thus, embodiments may compute the displacement vector from $l_i$ to $l_j$ in the robot frame as $${}^l d_k^{ij} = {}^l\Delta_k^j - {}^l\Delta_k^i = {}^l g_d(z_k^j, z_k^i). \quad (9)$$

Equation (9) shows that ${}^l d_k^{ij}$ is independent of robot position $p_k$ and orientation $\theta_k$. Hence, the vector of local relative measurements is as follows:

$${}^l\hat{d}_k = {}^l g_d(z_k) = \begin{bmatrix} {}^l g_d\left(z_k^{l_{k_1}}, z_k^{l_{k_2}}\right) \\ {}^l g_d\left(z_k^{l_{k_1}}, z_k^{l_{k_3}}\right) \\ \vdots \\ {}^l g_d\left(z_k^{l_{k_{n-1}}}, z_k^{l_{k_n}}\right) \end{bmatrix}. \quad (10)$$

Note in Equation (10) that though measurements to each feature are independent, the set of relative feature measurements may be correlated due to the correlations between relative measurements using the same range-bearing measurement. This is where a difference from some approaches arises. There may be a benefit of capturing independent measurements of relative feature displacements. Independence may be achieved by capturing heading and range bearing observations by stopping the robot at certain times (e.g., keyframes).

Let ${}^l\hat{d}_k \sim \mathcal{N}({}^l d_k, {}^l R_{d_k} = \nabla^l g_d|_{z_k} R_{z_k} \nabla^l g_d^T|_{z_k})$ be the vector of independent relative feature measurements at time $t_k$ with error covariance ${}^l R_{d_k}$, where $\nabla^l g_d|_{z_k}$ is the Jacobian of the local relative measurement function in Equation (10). At $t_0$, embodiments have keyframe ${}^\kappa x_0$ whose prior belief $b_0 \sim \mathcal{N}(\hat{x}_0=[p_0^T, \theta_0^T]^T, P_0)$ is known. The robot starts moving and collecting orientation and exteroceptive measurements at each timestep. At some future timestep $t_k$, embodiments have keyframe ${}^\kappa x_k$. Let ${}^l\hat{d}_{1:k-1} \sim \mathcal{N}({}^l d_{1:k-1}, {}^l R_{d_{1:k-1}})$ be the vector of local relative feature measurements captured from time $t_1$ to $t_k$. At keyframes ${}^\kappa x_0$ and ${}^\kappa x_k$ embodiments have robot to feature relative measurements ${}^l\hat{\Delta}_{0,k} \sim \mathcal{N}({}^l\Delta_{0,k}=[{}^l\Delta_0^T, {}^l\Delta_k^T]^T, {}^l R_{\Delta_{0,k}}=\text{blkdiag}([{}^l R_{\Delta_0}, {}^l R_{\Delta_k}]))$. At each pose embodiments have a noisy unbiased heading measurement which gives the vector of orientation estimates $\hat{\theta}_{0:k} \sim \mathcal{N}(\theta_{0:k}, R_{\theta_{0:k}})$. Dropping the time subscript, the vector of local relative measurements ${}^l d$ can be transformed to the world frame as:

$$\begin{bmatrix} {}^w\hat{d} \\ {}^w\hat{\Delta} \end{bmatrix} = \hat{C}^T \begin{bmatrix} {}^l\hat{d} \\ {}^l\hat{\Delta} \end{bmatrix} \quad (11)$$

where:
$\hat{C} = \hat{C}(\theta)$ is the corresponding composition of DCM matrices.

Heading error covariances may be propagated appropriately in the feature and robot position estimation. Thus, embodiments set up a new measurement model $\gamma = h_\gamma(x_0, {}^l\Delta, {}^l d, \theta) + v_\gamma$ by stacking the transformed relative position and heading measurements. This gives the following linear problem:

$$\gamma = \begin{bmatrix} \hat{p}_0 \\ \hat{C}^T {}^l\hat{d} \\ \hat{C}^T {}^l\hat{\Delta} \\ \hat{\theta} \end{bmatrix} = \underbrace{\begin{bmatrix} A' & 0 \\ 0 & I \end{bmatrix}}_{A} \begin{bmatrix} p_0 \\ 1 \\ p \\ \theta \end{bmatrix} + v_\gamma, \quad (12)$$

where:
$[p_0^T, l^T, p^T, \theta^T]^T$ is the vector of robot poses, landmarks and heading,
$A'$ is a matrix with each row containing elements of the set $\{-1, 0, +1\}$, and
$v_\gamma \sim \mathcal{N}(0, R_\gamma)$ is the measurement noise vector, where:

$$R_\gamma = \nabla h_\gamma \begin{bmatrix} P_0 & 0 & 0 & 0 \\ 0 & {}^l R_d & 0 & 0 \\ 0 & 0 & {}^l R_\Delta & 0 \\ 0 & 0 & 0 & \Sigma_\theta \end{bmatrix} \nabla^T h_\gamma. \quad (13)$$

$\nabla h_\gamma$ is the Jacobian of measurement function $h_\gamma$ given by $$\nabla h_\gamma = \begin{bmatrix} I & 0 & 0 & 0 \\ 0 & 0 & C^T & M^l\hat{d} \\ 0 & C^T & 0 & M^l\hat{\Delta} \\ 0 & 0 & 0 & I \end{bmatrix}, \text{ where } M = \frac{\partial \hat{C}^T}{\partial \theta}\bigg|_{\theta=\hat{\theta}}. \quad (14)$$

The solution to the linear problem in equation (12) is given by:

$$\begin{bmatrix} p_0^* \\ 1^* \\ p^* \\ \theta^* \end{bmatrix} = (A^T R_\gamma^{-1} A)^{-1} A^T R_\gamma^{-1} \gamma. \quad (15)$$

In some embodiments, the localization error grows as a robot explores an unknown map. It may be assumed that the robot makes independent relative feature measurements and the error covariance of each global relative measurement is $R_\alpha$. The first and last pose of the robot are considered as keyframes with the first pose known.

Referring to the case depicted in FIG. 3B, i.e., the robot maps four banks of two features each ($n_{fb}=2$) followed by a final keyframe pose and inspection of the estimation error in the final keyframe. Let the vector of relative measurements be $\gamma$. Further, odometry may be discarded as it is superfluous to map estimation when global orientation measurements are available and robot observes common features between successive keyframes (recall that relative feature displacements in world frame are independent of robot position). Embodiments can setup a linear estimation problem for landmark and keyframe pose estimation for FIG. 3B as:

$$\gamma = A \begin{bmatrix} 1 \\ p \end{bmatrix} + v_\gamma. \quad (16)$$

Solving the linear least squares problem in equation (16), the information matrix $\Omega$ then is given by:

$$\Omega = \sum^{-1} = A^T R_\gamma^{-1} A = \quad (17)$$

$$\begin{bmatrix}
3R_a^{-1} & 0 & -R_a^{-1} & -R_a^{-1} & 0 & 0 & 0 & 0 & 0 \\
0 & 3R_a^{-1} & -R_a^{-1} & -R_a^{-1} & 0 & 0 & 0 & 0 & 0 \\
-R_a^{-1} & -R_a^{-1} & 4R_a^{-1} & 0 & -R_a^{-1} & -R_a^{-1} & 0 & 0 & 0 \\
-R_a^{-1} & -R_a^{-1} & 0 & 4R_a^{-1} & -R_a^{-1} & -R_a^{-1} & 0 & 0 & 0 \\
0 & 0 & -R_a^{-1} & -R_a^{-1} & 4R_a^{-1} & 0 & -R_a^{-1} & -R_a^{-1} & 0 \\
0 & 0 & -R_a^{-1} & -R_a^{-1} & 0 & 4R_a^{-1} & -R_a^{-1} & -R_a^{-1} & 0 \\
0 & 0 & 0 & 0 & -R_a^{-1} & -R_a^{-1} & 3R_a^{-1} & 0 & -R_a^{-1} \\
0 & 0 & 0 & 0 & -R_a^{-1} & -R_a^{-1} & 0 & 3R_a^{-1} & -R_a^{-1} \\
0 & 0 & 0 & 0 & 0 & 0 & -R_a^{-1} & -R_a^{-1} & 2R_a^{-1}
\end{bmatrix}$$

$\Omega$ has a symmetric tridiagonal structure that permits an analytical inversion to compute the error covariance matrix. An analytical solution of the error covariance matrix may allow prediction of feature localization uncertainty at the goal given certain environment characteristics, e.g., the number of features in each bank and how many banks the robot may map as it traverses to the goal. The capability to predict future localization uncertainty implies that given a desired goal accuracy, active sensing to control error growth may be applied.

Figure 7A:
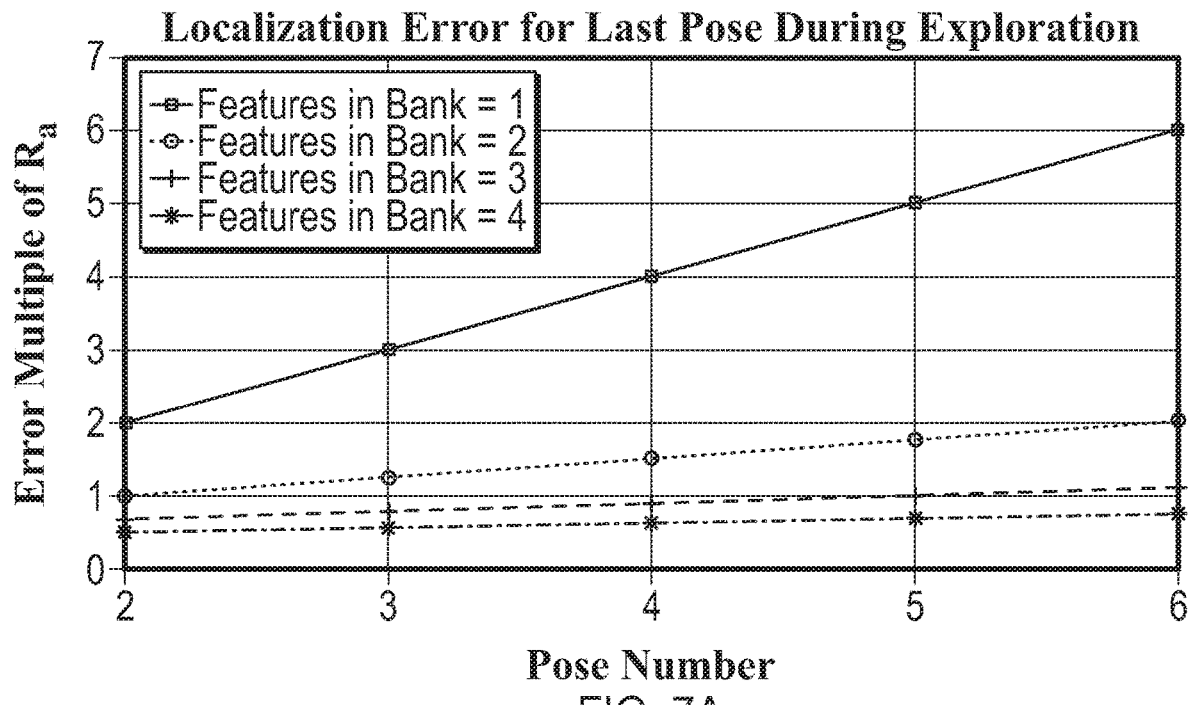
FIG. 7A is a graph of linear error growth in estimate of a last pose as a function of how far a robot moves away from its start of an embodiment described herein.
Figure 7B:
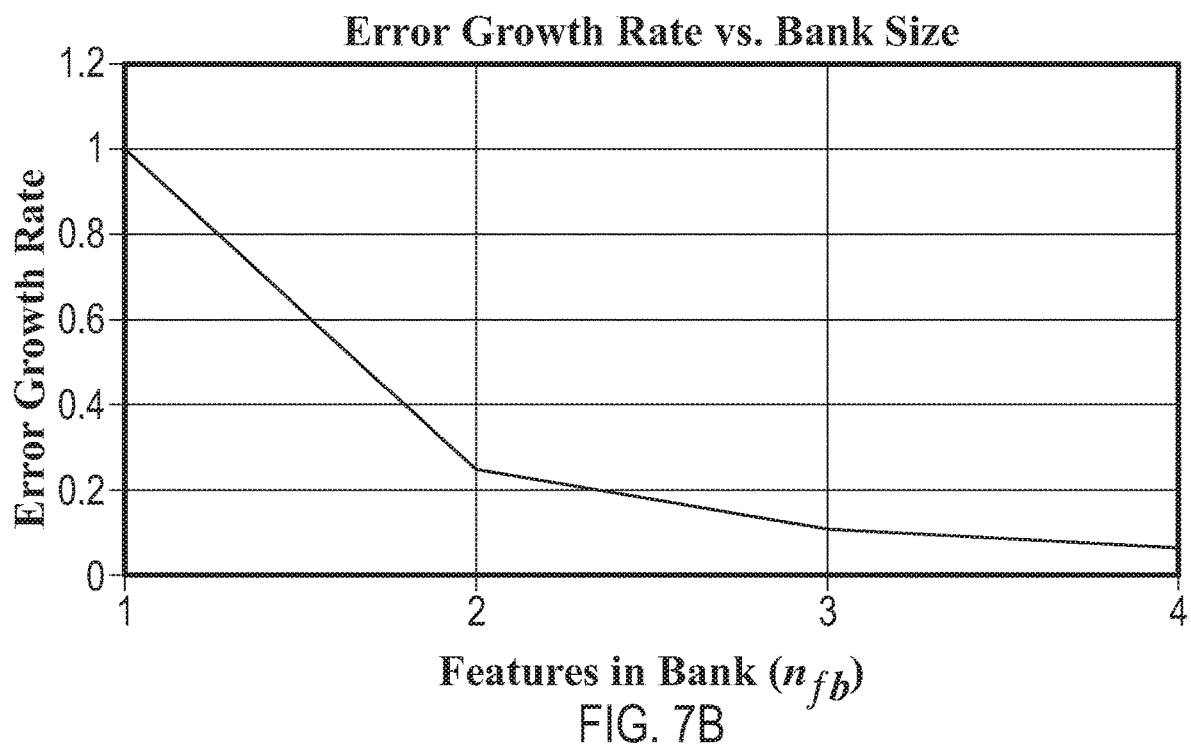
FIG. 7B is a graph of reduction in error growth rate as a number of landmarks increases of an embodiment described herein.
Figure 7C:
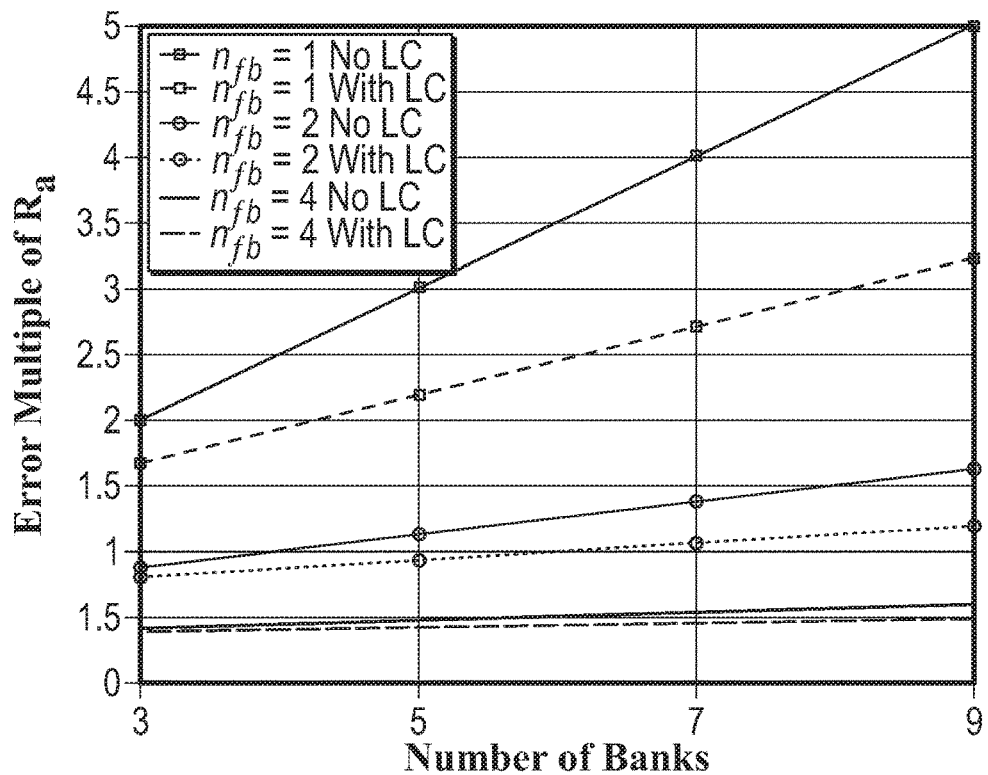
FIG. 7C is a graph of localization error for a feature bank most distant from a starting location before and after loop closure of an embodiment described herein.

The linear estimation problem of equation (12) may be analytically solved and error covariance $\Sigma$ computed for multiple cases by varying bank size $n_{fb}$ and the number of banks that the robot maps. FIGS. 7A, 7B, 7C, and 7D show results of analysis of the feature mapping and localization error as the robot moves and the effect of loop closure. FIG. 7A shows that localization error grows linearly as the robot moves away from the start location. Further, the error growth rate shown in FIG. 7B is inversely proportional to the square of the size of each feature bank, i.e., $$\propto \frac{1}{n_{fb}^2}$$

where $n_{fb}$ is the number features in one bank. Thus error growth may be controlled by the number of features mapped in each bank.

Figure 6A:
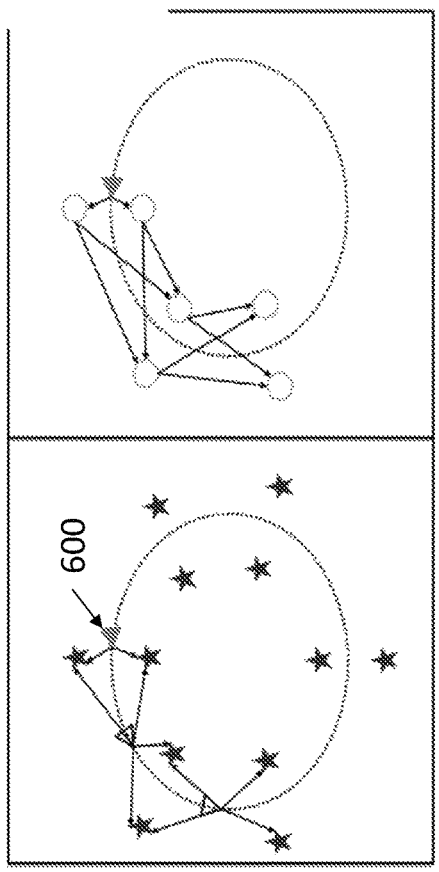
FIG. 6A is a diagram of an embodiment of a robot starting to make observations to a first bank of features.
Figure 6C:
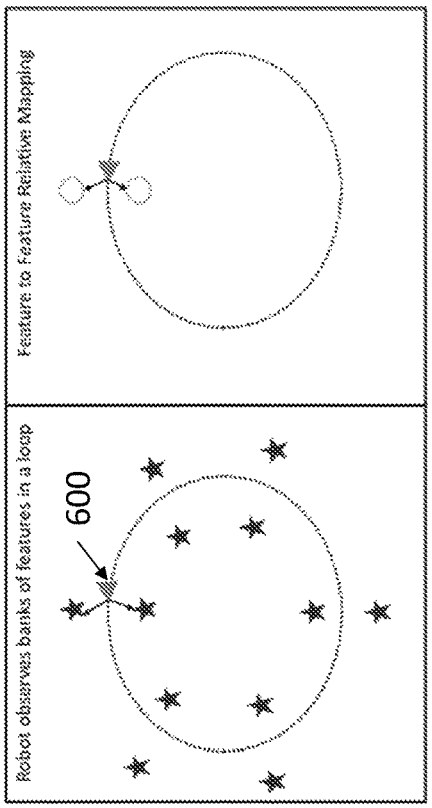
FIG. 6C is a diagram of an embodiment of a robot moving towards its start location.
Figure 6B:
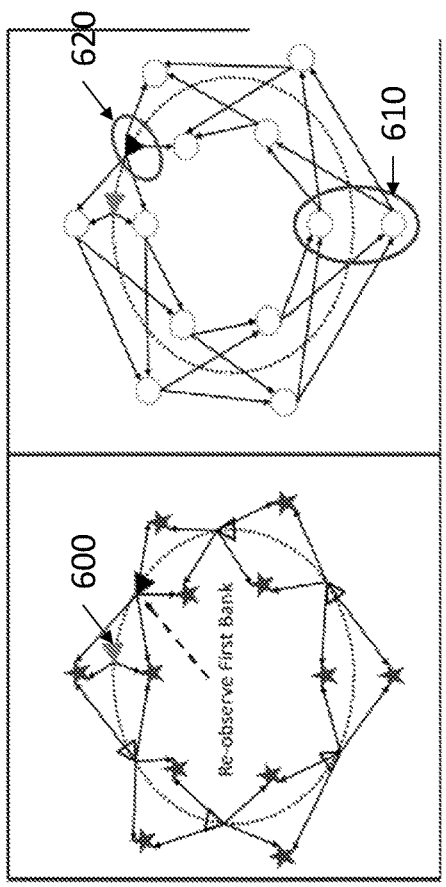
FIG. 6B is a diagram of an embodiment of a robot starting to making relative observations between a second bank of features and a third bank of features.
Figure 6D:
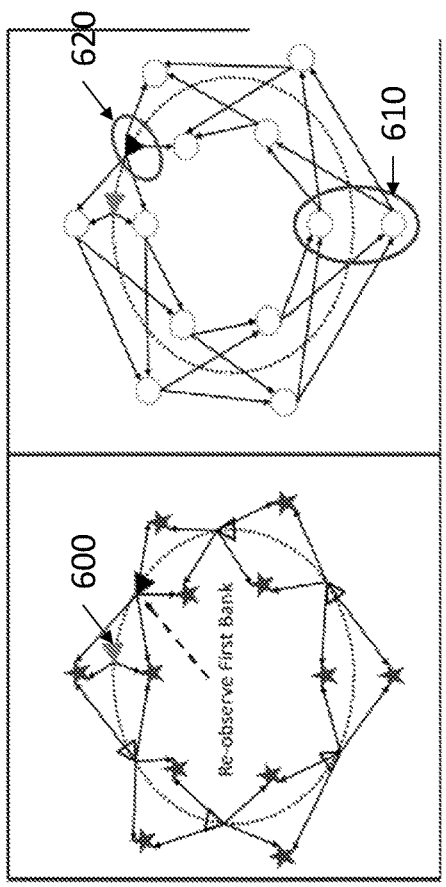
FIG. 6D is a diagram of an embodiment of a robot re-observing the first bank of features.
Figure 7D:
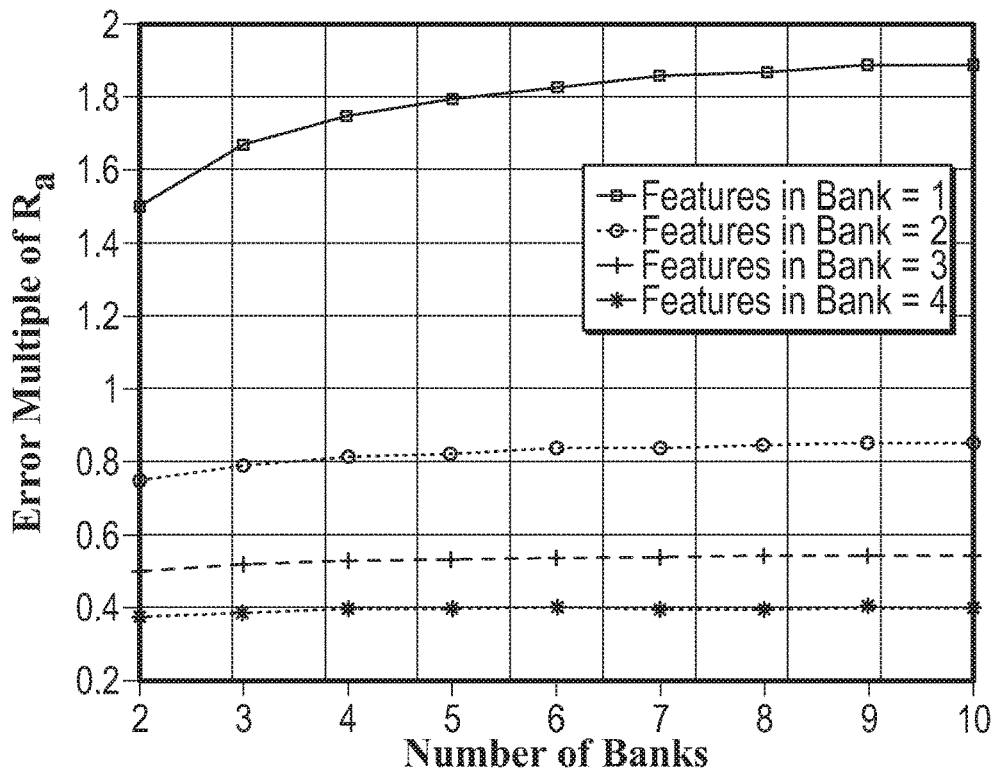
FIG. 7D is a graph of localization error in a last bank after loop closure as the trajectory length (number of banks mapped) increases of an embodiment described herein.

FIGS. 6A, 6B, 6C, and 6D show a simple graphical depiction of loop closure, the left half of each figure shows the robot 600 making range bearing measurements and the right half shows the map being built. FIG. 6D concerns the estimation error of the farthest feature bank (encircled by ellipse 610) and the last pose (encircled by ellipse 620). Thus, FIGS. 6A, 6B, 6C, and 6D depict loop closure when a robot makes relative feature measurements while moving in a circular trajectory. The exercise of solving equation (16) is repeated, albeit with loop closure and the error covariance $\Sigma$ is computed. The results of this analysis are plotted in FIGS. 7C and 7D. The ratio of error growth rate with loop closure to error growth rate without loop closure is a constant value of 0.5181 for all values of $n_{fb}$ computed as the ratio of slopes of curves plotted in FIG. 7C before and after loop closure. FIG. 7D shows that error in last pose after loop closure converges to a fixed value as the trajectory length (number of banks) increases.

Looking at FIG. 6D (right half), there are two "pathways" that link the farthest bank of features to the first bank. Prior to loop closure there is only one path for the relative measurements to constrain feature estimates to the first bank, however, after loop closure there is a second pathway from the opposite direction. An interesting point to be made is that if two observations ($R_\alpha$ is halved) were taken for each relative feature displacement, embodiments would effectively end up with the same estimation error at the farthest bank were the robot not to close the loop. The second observation shows that the estimation error in the last bank of features is dominated by the relative measurement to the first bank, i.e., as the trajectory length grows, the effect of the longer "pathway" from start has almost no effect on estimation accuracy.

Figure 8A:
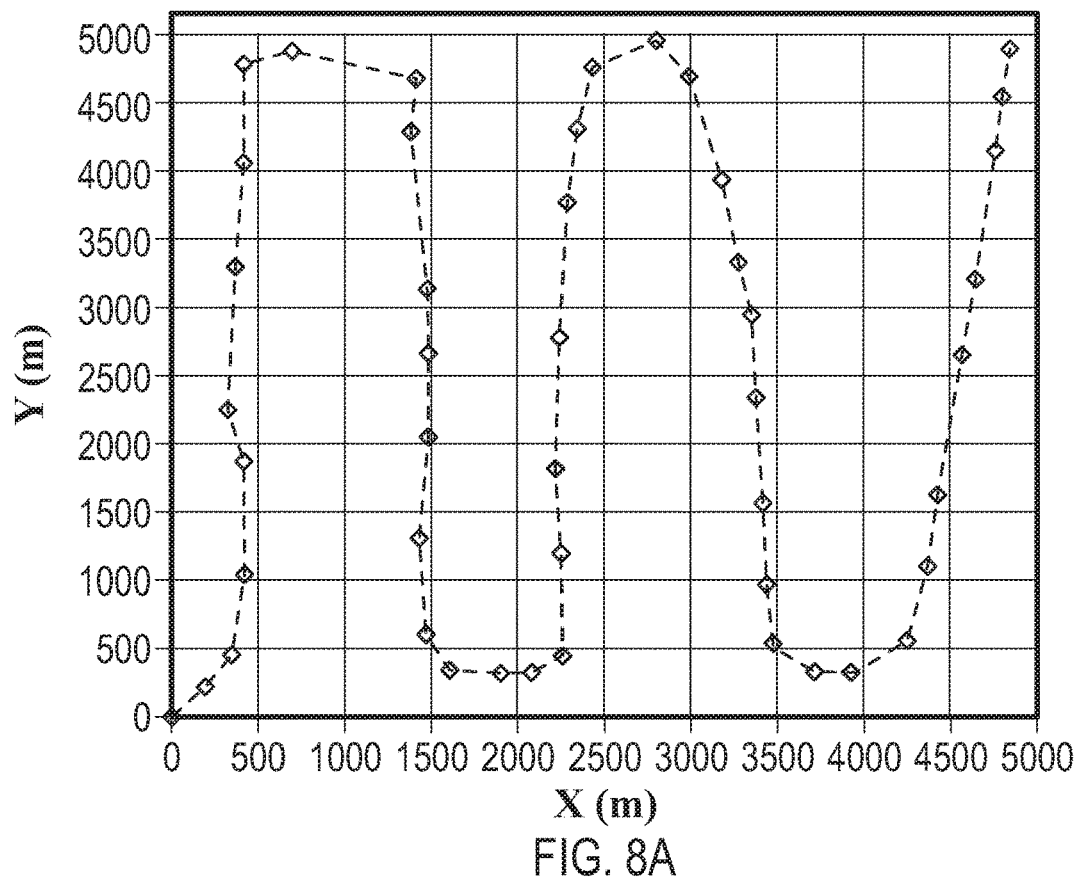
FIG. 8A is a diagram of an embodiment of robot trajectory over 5 square kilometers (km) with a 25.9 km trajectory.
Figure 8B:
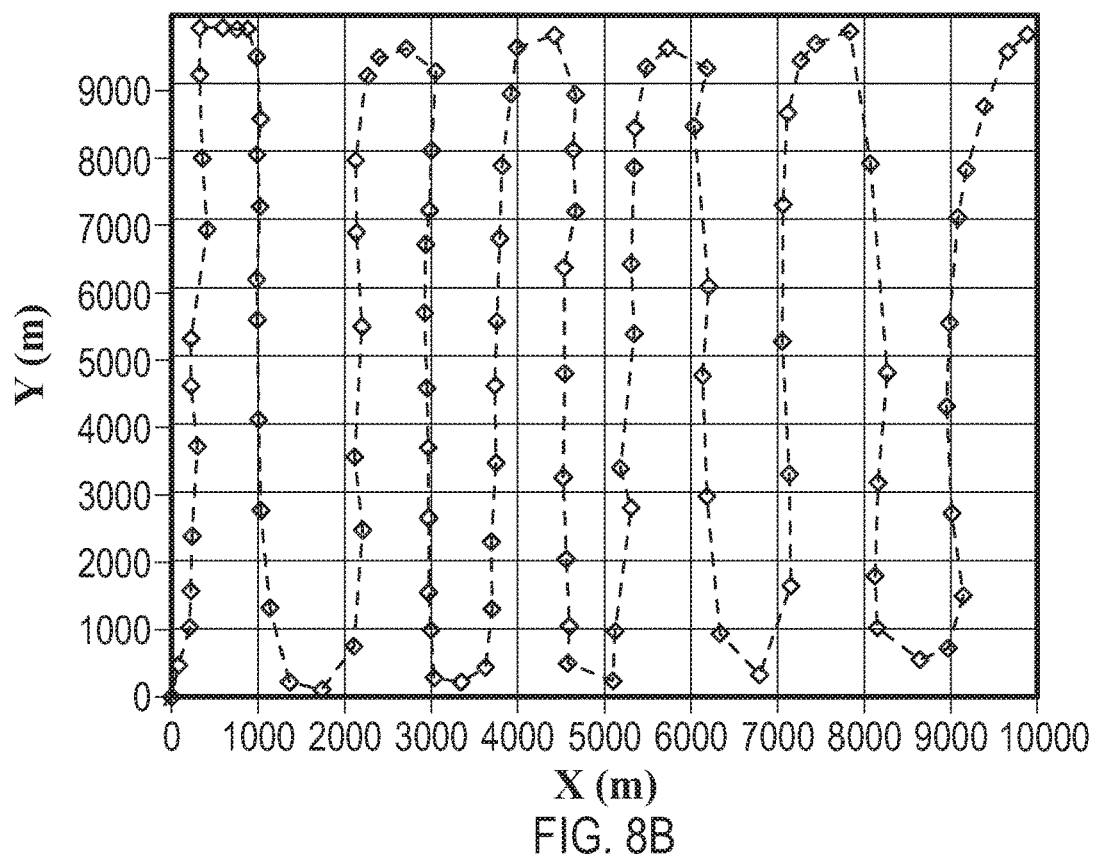
FIG. 8B is a diagram of an embodiment of robot trajectory over 10 square km with a 107.9 km trajectory.

FIGS. 8A and 8B present simulation scenarios for waypoint following in a 2D environment. These simulations study the case of a long term exploration task where a robot may not visit prior locations. The robot may be equipped with three sensors: a star tracker with noise standard deviation $\sigma_\theta=0.005°$ (18 arcseconds); a range bearing sensor with a 360° field-of-view, range of 20 m and noise standard deviation of $\sigma_r=0.1$ m in range and $\sigma_\phi=1.0°$ in bearing; and wheel odometery with noise standard deviation $\sigma_{\delta x, \delta y}=0.1$ m in translation and $\sigma_{\delta\theta}=1.2°$ in rotation. The robot may move at a speed of 10 m/s and simulation time step is 0.05 s. FIG. 8A shows a scenario with a 2D world (5 km×5 km) with a trajectory of length 25.9 km. FIG. 8A shows a scenario with a 2D world (10 km×10 km) with trajectory of length 107.9 km. Both scenarios are obstacle free and landmarks are randomly placed along the trajectory. Both trajectories terminate far from the start location and there are no loop closures.

Figure 9A:
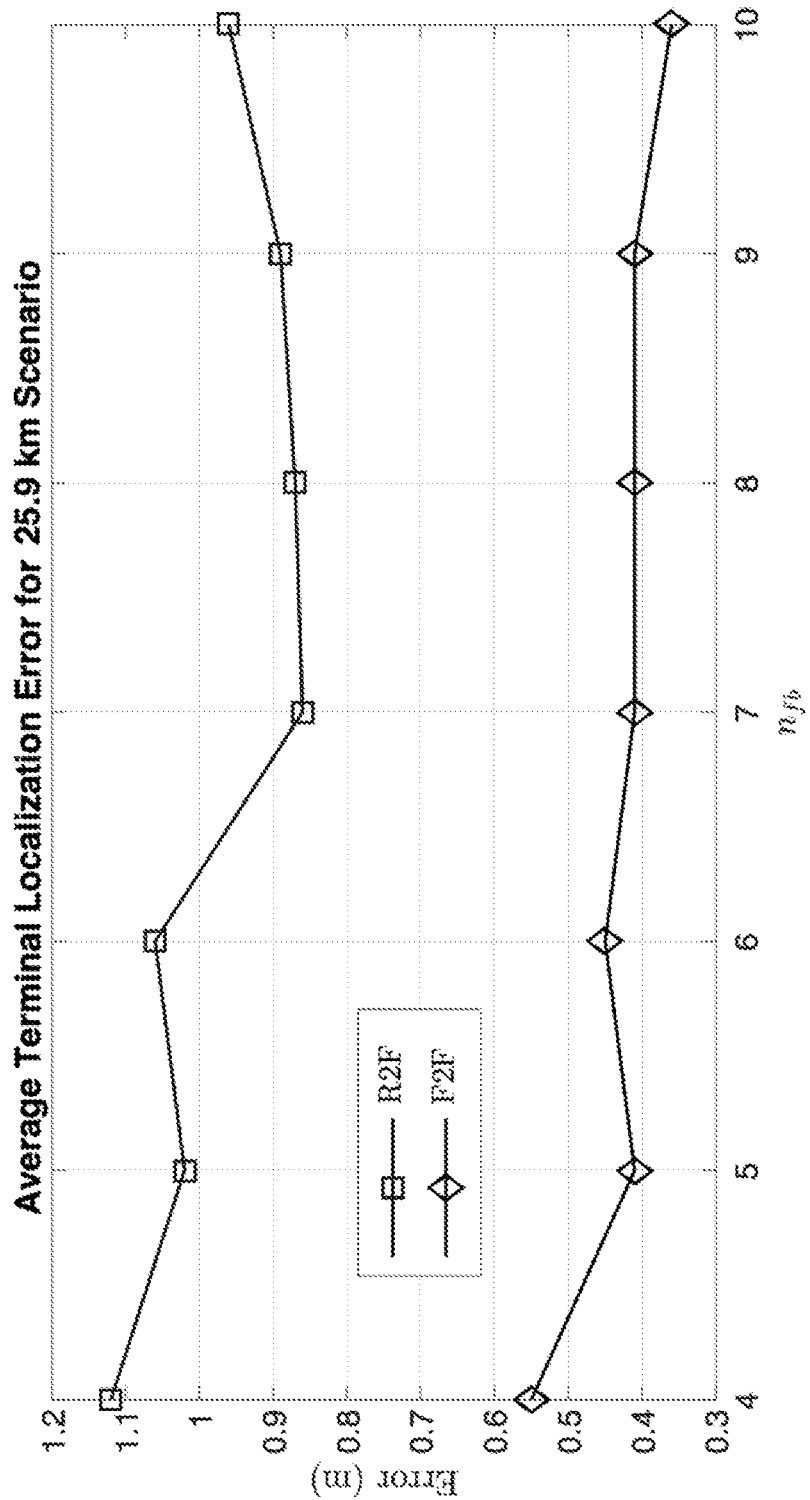
FIG. 9A is a graph of average terminal pose localization error as the bank size increases with the 25.9 km trajectory of an embodiment described herein.
Figure 9B:
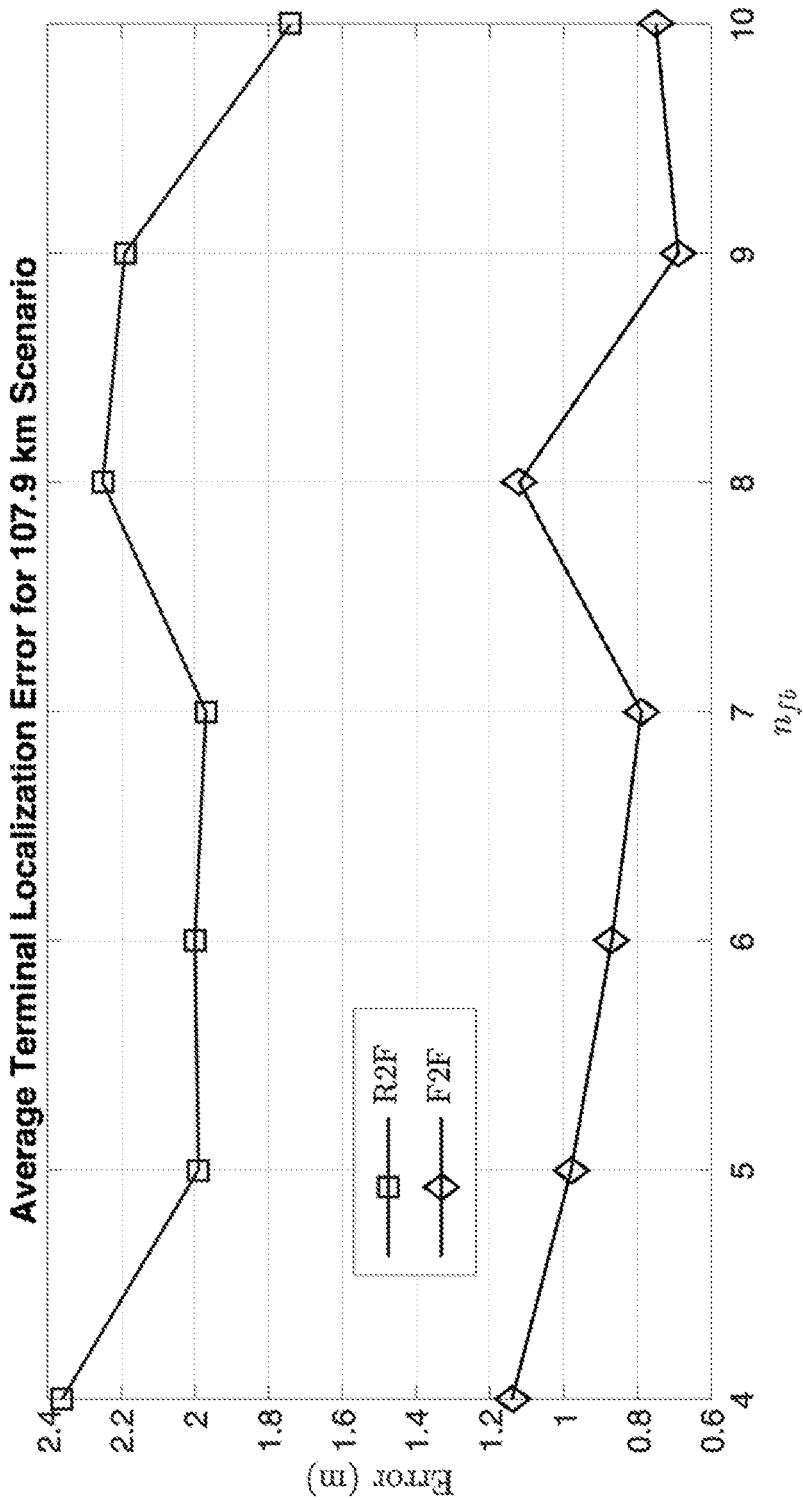
FIG. 9B is a graph of average terminal pose localization error as the bank size increases with the 107.9 km trajectory of an embodiment described herein.

Using the R2F approach, for the scenarios of FIGS. 8A and 8B, multiple versions of the environment were generated varying the number of features visible at each pose. Using the F2F approach, for the scenarios of FIGS. 8A and 8B, multiple versions of the environment were generated varying the number of features visible at each pose. FIGS. 9A and 9B respectively compare the average terminal localization error obtained using the R2F approach in each of the scenarios of FIGS. 8A and 8B with the average terminal localization error obtained using the F2F approach in each of the scenarios of FIGS. 8A and 8B.

Trigonometric functions of robot orientation are the primary source of non-linearity in SLAM which makes predicting long-term error growth difficult. Analysis shows that given unbiased heading measurements, localization error growth is linear as a robot moves away from its start location. The error growth rate may be controlled by the quality and number of measurements. Further, loop closure may be avoided when absolute heading is available as the same effect may be achieved by taking prolonged measurements. Feature estimates may be consistent due to the linear nature of the problem which may lead to a global minimizer. Consistent feature estimates may lead to better localization as the robot has a reliable notion of uncertainty about its estimated mean.

Indoor Embodiments

The following embodiments describe systems that operate in an indoor environment where the upward facing sensor detects objects on or attached to the ceiling of an indoor environment. Some of the techniques in these embodiments may be used in either the indoor and outdoor embodiments. In indoor settings the system may use stable structural features as structural cues, for example, in a warehouse building, the ceiling corrugation or ceiling lights are usually aligned along one direction. Thus, the orientation of the building may be fixed in the direction of ceiling direction and a vehicle may estimate its orientation with respect to the building by observing the ceiling.

In an embodiment, let $x=\{x_0, \ldots, x_n\}$ be a set of n+1 poses, describing the robot position and orientation at each time k. In 2D (planar) problems, $x_k=[p_k^T \theta_k]^T \in SE(2)$, where $p_k \in \mathbb{R}^2$ is the position and $\theta_k \in SO(2)$ is the heading. Let $\xi_{ij}$ be a measurement pose of j w.r.t to pose i then, $$\xi_{ij} = \begin{bmatrix} {}^i\Delta_{ij} = R_i(p_j - p_i) \\ \theta_j - \theta_i \end{bmatrix}$$

where $R_i$ is the rotation matrix composed by $\theta_i$. In the general setting, $\xi_{ij}$ is corrupted by noise, thus $\hat{\xi}_{ij}=\xi_{ij}+v_{ij}$, where $v_{ij}$ is zero-mean Gaussian. Let ${}^i\Delta$ be the vector of relative position measurements in the local frame at each pose and. If robot orientation $\theta^*$ is known at each pose, then the SLAM problem becomes, $${}^w\Delta=R(\theta^*)^{T}{}^i\Delta$$

${}^w\Delta=A'p$ where $A'$ is a matrix composed of elements in the set $\{-1,0,1\}$ and p is the vector of robot positions in the global frame. Thus, when robot orientation $\theta$ is known, the position estimation problem is linear. Moreover, when unbiased global heading measurements are available, the problem may be very accurately linearized. This may provide localization accuracy leading to robustness in the front-end and enabling computationally low-cost linear-least squares solutions for the back-end. The same concept may be used with 3D problems where the relative orientation measurement $\theta_j - \theta_i$ may be represented as $R_j R_i^T$.

The indoor approach includes three aspects. 1) Sensing absolute orientation of the robot using structural cues. 2) Fusing absolute orientation measurements to the front-end, i.e., a scan matching algorithm. 3) Solving the batch optimization problem to compute global estimates at loop closure.

Independent absolute orientation estimates of the robot heading may be determined. In an indoor environment the relative heading of the robot with respect to the building's true north may be used as the absolute heading. The orientation sensing method may detect structural features of the environment. In most indoor environments, e.g., offices, factories, warehouses etc. the ceiling structure usually has straight line features. For example, ceiling corrugation or ceiling lights in most industrial buildings are aligned along one direction which may be detected by a ceiling facing camera. Ceiling direction may be estimated as follows.

First, extract line features from a ceiling image, the line features may be an edge of a light fixture or a part of a corrugated ceiling. Next, compute orientation of the line features in the image frame. The system may then create a histogram of the orientation data with bins of width b in range [0, $2\pi$). The system may then create a window of width W around the bin with highest frequency, i.e., the bin with maximum observations. The system then computes the weighted mean of observations in the window. The ceiling direction may then be computed as an angle $\theta_c \in [0, \pi)$.

Line direction may be ambiguous, i.e., it may be difficult to differentiate north from south. Therefore, gyro data may be used in the intermediate time between absolute orientation measurements. Gyros may provide data at >100 Hz and therefore may be used to account for the angle wrap-around issue in absolute orientation detection. To estimate the robot heading, initial heading at time $t_0$ is assumed to be known.

To a regular scan matching based front-end we add a Kalman filter after the scan match step. This Kalman filter fuses relative orientation estimates from scan matching with absolute orientation estimates as computed previously (using a ceiling facing camera and gyro). Let $$\bar{\theta}_k \sim \mathcal{N}\left(\theta_k, \sigma_{\bar{\theta}_k}^2\right)$$

be the absolute orientation measurement at time $t_k$ and $\theta_{k-1}^+$ be the heading estimate of the robot at $t_{k-1}$. Let $\delta\hat{\theta}_{k-1,k} \sim \mathcal{N}(\delta\theta_{k-1,k}, \sigma_{\delta\theta_{k-1,k}}^2)$ be the relative orientation measurement from pose $x_{k-1}$ to $x_k$ as computed by scan matching, Then $\hat{\theta}_k$ is computed as follows.

First the relative orientation estimate is used to compute a prediction, $$\theta_k^- = \theta_{k-1}^+ + \delta\theta_{k-1,k}$$

$$\sigma^2{}_{\theta_k}^- = \sigma^2{}_{\theta_{k-1}}^+ + \sigma_{\delta\theta_{k-1,k}}^2$$

Then, the absolute orientation measurement is used to compute the update as follows:

$$\tilde{y}_k = \bar{\theta}_k - \theta_k^-$$

$$s_k = \sigma_{\bar{\theta}_k}^2 + \sigma^2{}_{\theta_k}^-$$

$$K_k = \sigma^{2-}_{\theta_k} s_k^{-1}$$

$$\theta_k^+ = \theta_k^- + K_k \tilde{y}_k$$

$$\sigma^{2+}_{\theta_k} = (1 - K_k)\sigma^{2-}_{\theta_k}$$

Fusing orientation information may add robustness to the front-end. Small errors in relative orientation measurements may add up over time to create a super linear growth in localization error. This problem may arise from the non-linear nature of the orientation.

In an embodiment, the SLAM back-end may use the graph generated by the front-end along with absolute orientation data and solve a two-step optimization problem. The first step may be the estimation of robot orientation using the absolute orientation and relative orientation measurements followed by a second step in which a linearized least-squares optimization problem may be solved for the robot position.

Robot orientation $\theta \in (-\pi, \pi]$, thus as the robot navigates, the relative orientation measurements may not provide information about the angle wrap around. Let $\delta\theta_{i,j}$ be the relative orientation measurement from pose $x_i$ to $x_j$, then $$\delta\theta_{i,j} = \phi(\theta_j - \theta_i)$$

where:
$\phi$ is the module operator such that $\phi(\theta) \in (-\pi, \pi]$.

Thus the regularized relative orientation measurement $\overline{\delta\theta}$ is $$\overline{\delta\theta}_{i,j} = \theta_j - \theta_i + 2k_{ij}\pi$$

Here $k_{ij}$ is the integer ambiguity. In our approach, since absolute orientation measurements are available, the integer ambiguity can be simply be calculated as:

$$k_{ij} = \text{round}((\overline{\delta\theta}_{i,j} - (\overline{\theta}_j - \overline{\theta}_i))/2\pi)$$

Once the regularization constants are computed, we formulate a linear estimation problem by stacking together the absolute orientation measurement vector $\overline{\theta}$ and regularized relative orientation measurement vector $\overline{\delta\theta}$ as $$\beta = \begin{bmatrix} \overline{\delta\theta} \\ \overline{\theta} \end{bmatrix} = \underbrace{\begin{bmatrix} B' & 0 \\ 0 & 1 \end{bmatrix}}_{B} \theta + \begin{bmatrix} v_{\delta\theta} \\ v_{\overline{\theta}} \end{bmatrix},$$

which can be solved for the global orientation estimate as $$\hat{\theta} = (B^T R_\beta^{-1} B)^{-1} B^T R_\beta^{-1} \beta$$

and the estimate error covariance is $(B^T R_\beta^{-1} B)^{-1}$

Once a global orientation estimate $\theta$ is computed, we proceed to compute robot position at each pose. We know that a relative pose measurement from pose $x_i$ to $x_j$ contains a relative position measurement $\Delta$ as $$^l\Delta_{ij} = R_i(p_j - p_i)$$

where:
$^l\Delta_{ij}$ is the displacement measured in the local frame of pose $x_i$ and $p_i$, $p_j$ are the 2D positions.

Let $^l\Delta \sim \mathcal{N}(^l\Delta, ^l R_\Delta)$ be the vector of all local relative position measurements. The vector of local relative measurements can be transformed to the global frame. Thus the linear estimation problem may be formulated as:

$$^w\hat{\Delta} = \hat{R}^l\Delta = A'p + {}^w v_\Delta.$$

$\hat{R} = R(\hat{\theta})$ is the corresponding composition of rotation matrices parametrized by the estimated heading $\hat{\theta}$, $p$ is the vector of robot positions, $A'$ is a matrix with each row containing elements of the set $[-1, 0, +1]$ and $^w v_\Delta \sim \mathcal{N}(0, {}^w R_\Delta = C^T {}^l R_\Delta C)$ is the noise vector.

After computing the orientation estimates $\hat{\theta}$ along with the transformed global relative position measurements they are stacked to give a new measurement vector $\gamma$:

$$\gamma = h_w(^l\Delta, \theta) + v_w = \begin{bmatrix} \hat{R}^l\hat{\Delta} \\ \hat{\theta} \end{bmatrix} = \underbrace{\begin{bmatrix} A' & 0 \\ 0 & 1 \end{bmatrix}}_{A} \begin{bmatrix} p \\ \theta \end{bmatrix} + \begin{bmatrix} ^w v_\Delta \\ v_\theta \end{bmatrix}.$$

The error covariance $R_\gamma$ of measurement vector $\gamma$ is given by:

$$R_\gamma = \nabla h_w \begin{bmatrix} {}^l R_\Delta & 0 \\ 0 & \sum_\theta \end{bmatrix} \nabla^T h_w$$

where:
$\nabla h_w$ is the Jacobian of measurement function $h_w$ given by:

$$\nabla h_w = \begin{bmatrix} R & M\,{}^l\hat{\Delta} \\ 0 & I \end{bmatrix},$$

where $= \dfrac{\partial C^T}{\partial \theta}$.

Thus:

$$R_\gamma = \begin{bmatrix} {}^w R_\Delta + M\sum_\theta M^T & M\sum_\theta \\ \sum_\theta M^T & \sum_\theta \end{bmatrix}.$$

Thus, the solution to the linear estimation problem is given by:

$$\begin{bmatrix} p^* \\ \theta^* \end{bmatrix} = (A^T R_\gamma^{-1} A)^{-1} A^T R_\gamma^{-1} \gamma$$

Note that the above involves the inversion of a large sparse matrix $R_\gamma$ which may not be suitable for implementation due to complexity and potential numerical issues. However, this inversion may be avoided by analytically computing the information matrix $\Omega_\gamma = R_\gamma^{-1}$ using block-matrix inversion rules as:

$$\Omega_\gamma = \begin{bmatrix} {}^w R_\Delta^{-1} & -{}^w R_\Delta^{-1} M \\ -M^T\,{}^w R_\Delta^{-1} & \Omega_\theta + M^T\,{}^w R_\Delta^{-1} M \end{bmatrix}.$$

Figure 10B:
FIG. 10B is a diagram of an embodiment of a thresholded image of the ceiling.
Figure 10A:
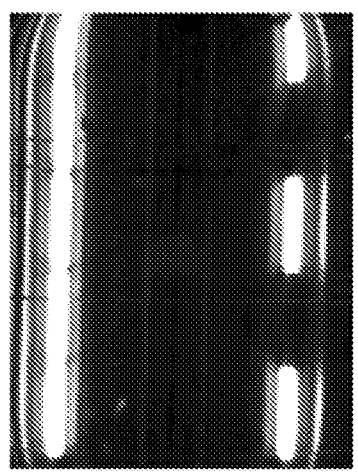
FIG. 10A is a diagram of an embodiment of a camera view of a ceiling.

In an embodiment, a robot may be configured with a LiDAR with 360 sensing, a monocular ceiling facing camera, an IMU, and a processor. The robot may be deployed in a warehouse where GPS signal is degraded or unavailable. The ceiling of the warehouse may be equipped with rectangular light fixtures at regular intervals which may be leveraged for orientation estimation. In some embodiments, the processor may threshold the image such that a binary image is created. Thus the ceiling lights may appear as rectangular bright spots while rest of the image appears black. FIG. 10A shows the ceiling camera's view and FIG. 10B shows the thresholded binary image. Heading estimates may be computed at 30 Hz. A first image captured by the camera may be used to determine an orientation of the robot. For example, the edge of the light fixture in the picture may be determined to be 0 degrees. As the robot travels and takes a subsequent image of the ceiling the angle of the light fixture in the subsequent image may be determined relative to 0 degree angle. This determination may be used to determine the absolute orientation. The processor may use a bin size b=0.5 degrees for the histogram operation used for orientation estimation. The processor may create a map of the warehouse based on inputs from the LiDAR, camera, and IMU using the techniques described above.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct connection. Thus, if a first device couples to a second device, that connection may be through a direct connection, or through an indirect connection accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

The above discussion is meant to be illustrative of the principles and various embodiments of the disclosure. Numerous variations and modifications will become apparent to those skilled in the art once the above disclosure is fully appreciated. For example, while some embodiments have been described herein with respect to facility inspection and risk assessment, those skilled in the art will understand that the principles disclosed herein are applicable to assessing risk associated with a wide variety of tangible inspection subjects or units. It is intended that the following claims be interpreted to embrace all such variations and modifications.

What is claimed is:

1. An electronic mapping system comprising:
    an upward facing sensor oriented to capture data in a direction perpendicular to a surface upon which the electronic mapping system travels;
    a range bearing sensor; and
    a processor in communication with the upward facing sensor and the range bearing sensor, the processor configured to:
        determine an absolute orientation estimate of the electronic mapping system based upon first data received from the upward facing sensor, wherein the first data is indicative of a line feature of a building structure;
        determine a location of local landmarks based upon second data received from the range bearing sensor;
        determine a relative orientation estimate based on the location of the local landmarks;
        fuse, using a Kalman filter, the absolute orientation estimate and the relative orientation estimate;
        determine a location of the electronic mapping system based upon a result of the fuse of the absolute orientation estimate and the relative orientation estimate, and
        create a new map of the building structure based only on the first data from the upward facing sensor and the second data from the range bearing sensor.

2. The electronic mapping system of claim 1, wherein the line feature is of an edge of a light fixture or a part of a corrugated ceiling.

3. The electronic mapping system of claim 2, wherein the upward facing sensor comprises a camera.

4. The electronic mapping system of claim 1 further comprising an inertial sensor, wherein the relative orientation estimate comprises a relative pose based upon a scan match, wherein the scan match comprises inputs of the second data and a third data received from the inertial sensor.

5. The electronic mapping system of claim 4, wherein the processor configured to determine the location of the electronic mapping system comprises the processor configured to estimate an orientation of the electronic mapping system based on the fuse of the absolute orientation estimate and the relative orientation estimate.

6. The electronic mapping system of claim 5, wherein the processor configured to determine the location of the electronic mapping system further comprises the processor configured to solve a least-squares optimization problem.

7. The electronic mapping system of claim 1, wherein the processor is further configured to update the map based upon the location of the mapping system and the location of the local landmarks.

8. The electronic mapping system of claim 1, wherein the processor is further configured to:
    extract the line feature from the first data received from the upward facing sensor; and
    determine an orientation angle of the extracted line feature,
    wherein the absolute orientation estimate is with respect to the determined orientation angle.

9. An autonomous vehicle comprising:
    an upward facing sensor oriented to capture data in a direction perpendicular to a surface upon which the autonomous vehicle travels;
    a range bearing sensor; and
    an electronic mapping system in communication with the upward facing sensor and the range bearing sensor, the electronic mapping system comprising a processor configured to:
        determine an absolute orientation estimate of the autonomous vehicle based upon first data received from the upward facing sensor, wherein the first data is indicative of a line feature of a building structure;
        determine a location of local landmarks based upon second data received from the range bearing sensor;
        determine a relative orientation estimate based on the location of the local landmarks;
        fuse, using a Kalman filter, the absolute orientation estimate and the relative orientation estimate;
        determine a location of the autonomous vehicle based upon a result of the fuse of the absolute orientation estimate and the relative orientation estimate; and
        create a new map of the building structure based only on the first data from the upward facing sensor and the second data from the range bearing sensor.

10. The autonomous vehicle of claim 9, wherein the line feature is of an edge of a light fixture or a part of a corrugated ceiling.

11. The autonomous vehicle of claim 10, wherein the upward facing sensor comprises a camera.

12. The autonomous vehicle of claim 9 further comprising an inertial sensor, wherein the relative orientation estimate comprises a relative pose based upon a scan match, wherein the scan match comprises inputs of the second data and a third data received from the inertial sensor.

13. The autonomous vehicle of claim 12, wherein the processor configured to determine the location of the autonomous vehicle comprises the processor configured to estimate an orientation of the electronic mapping system based on the fuse of the absolute orientation estimate and the relative orientation estimate.

14. The autonomous vehicle of claim 13, wherein the processor configured to determine the location of the electronic mapping system further comprises the processor configured to solve a least-squares optimization problem.

15. The autonomous vehicle of claim 9, wherein the processor is further configured to update the map based upon the location of the autonomous vehicle and the location of the local landmarks.

16. A method for mapping implemented by an electronic mapping system, the method comprising:
 determining an absolute orientation of the electronic mapping system based upon first data received from an upward facing sensor oriented to capture data in a direction perpendicular to a surface upon which the electronic mapping system travels, wherein the first data is indicative of a line feature of a building structure;
 determining a location of local landmarks based upon second data received from a range bearing sensor;
 determining a relative orientation estimate based on the location of the local landmarks;
 fusing, using a Kalman filter, the absolute orientation estimate and the relative orientation estimate;
 determining a location of the electronic mapping system based upon a result of fusing the absolute orientation estimate and the relative orientation estimate; and
 creating a new map of the building structure based only on the first data from the upward facing sensor and the second data from the range bearing sensor.

17. The method of claim 16, wherein the line feature is of an edge of a light fixture or a part of a corrugated ceiling.

18. The method of claim 16, wherein the relative orientation estimate comprises a relative pose based upon a scan match, wherein the scan match comprises inputs of the second data and a third data received from an inertial sensor.

19. The method of claim 18, wherein determining the location of the electronic mapping system comprises estimating an orientation of the electronic mapping system based on the fuse of the absolute orientation estimate and the relative orientation estimate.

20. The method of claim 19, wherein determining the location of the electronic mapping system further comprises the processor configured to solve a least-squares optimization problem.

21. The method of claim 16 further comprising updating the map based upon the location of the mapping system and the location of the local landmarks.

* * * * *